US012681397B2

(12) United States Patent
Zhu et al.

(10) Patent No.: US 12,681,397 B2

(45) Date of Patent: *Jul. 14, 2026

(54) ELECTROPHOTOGRAPHIC PHOTOCONDUCTOR, METHOD OF MANUFACTURING THE SAME, AND ELECTROPHOTOGRAPHIC APPARATUS

(71) Applicant: FUJI ELECTRIC CO., LTD., Kawasaki (JP)

(72) Inventors: Fengqiang Zhu, Matsumoto-city (JP); Shinjiro Suzuki, Matsumoto-city (JP); Masaru Takeuchi, Matsumoto-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 600 days.

This patent is subject to a terminal disclaimer.

(21) Appl. No.: 18/176,192

(22) Filed: Feb. 28, 2023

(65) Prior Publication Data

US 2024/0094649 A1 Mar. 21, 2024

(30) Foreign Application Priority Data

Aug. 23, 2022 (JP) ................................ 2022-132725

(51) Int. Cl.

*G03G 5/14* (2006.01)
*G03G 5/047* (2006.01)
*G03G 5/06* (2006.01)

(52) U.S. Cl.

CPC ............. *G03G 5/144* (2013.01); *G03G 5/047* (2013.01); *G03G 5/0696* (2013.01)

(58) Field of Classification Search

CPC ....... G03G 5/144; G03G 5/047; G03G 5/0696
See application file for complete search history.

(56) References Cited

U.S. PATENT DOCUMENTS

2016/0231659 A1* 8/2016 Tanaka ................... G03G 5/144
2020/0133146 A1* 4/2020 Shimada ................ G03G 5/142

FOREIGN PATENT DOCUMENTS

| | | | | |
|---|---|---|---|---|
| JP | H05257308 | A | | 10/1993 |
| JP | H05273775 | A | * | 10/1993 |
| JP | 107173405 | A | | 7/1995 |
| JP | H0882942 | A | | 3/1996 |
| JP | H09230615 | A | | 9/1997 |
| JP | 2018115098 | A | * | 7/2018 |

OTHER PUBLICATIONS

English machine translation of the description of JP-2018115098-A (Year: 2018).*
English machine translation of the description of JP-H05273775-A (Year: 1993).*

* cited by examiner

*Primary Examiner* — Mark F. Huff
*Assistant Examiner* — Boone Alexander Evans
(74) *Attorney, Agent, or Firm* — Rabin & Berdo. P.C.

(57) ABSTRACT

An electrophotographic photoconductor including a sequentially-provided conductive substrate, an undercoat layer, and a photosensitive layer. Photosensitive layer is a negatively-charged stacked type including a charge generation layer and a charge transport layer. Undercoat layer contains a resin binder and a first filler, the first filler including a zinc oxide particle surface-treated with an N-acylated amino acid or an N-acylated amino acid salt, and the charge generation layer containing an adduct compound of titanyl phthalocyanine and butanediol.

7 Claims, 3 Drawing Sheets

(a)

(b) (c)

ELECTROPHOTOGRAPHIC PHOTOCONDUCTOR, METHOD OF MANUFACTURING THE SAME, AND ELECTROPHOTOGRAPHIC APPARATUS

CROSS-REFERENCE TO RELATED APPLICATION

This Nonprovisional Patent Application for a U.S. patent claims the benefit of priority of JP2022-132725 filed Aug. 23, 2022, DAS code No. C56D, the entire contents of which is hereby incorporated by reference.

TECHNICAL FIELD

The present invention relates to an electrophotographic photoconductor (hereinafter, also referred to as "photoconductor"), a method of manufacturing the same, and an electrophotographic apparatus. Specifically, the present invention relates to an electrophotographic photoconductor which mainly includes a conductive substrate and a photosensitive layer containing an organic material and which is for use in, for example, a printer, a copier, or a fax machine of an electrophotographic system, a method of manufacturing the same, and an electrophotographic apparatus.

BACKGROUND ART

Electrophotographic photoconductors have basic structures whereas photosensitive layers having photoconductive functions are placed on conductive substrates. In recent years, organic electrophotographic photoconductors using organic compounds as functional components responsible for charge generation and transport have been actively researched and developed by means of the advantages of multiplicity, high productivity, safety, and the like of materials, and applications to, for example, copiers or printers have been progressed.

In general, photoconductors need to have the functions to retain surface charges in dark places, receive light and generate charges, and then transport the generated charges. Photosensitive layers perform these functions. Photoconductors are classified into single-layered photoconductors and stacked (function-separated) photoconductors, depending on the modes of photosensitive layers. Single-layered photoconductors include single-layered photosensitive layers having both charge generation and charge transport functions. Stacked photoconductors include photosensitive layers where charge generation layers and charge transport layers are stacked. Charge generation layers mainly generate charges in the reception of light. Charge transport layers retain surface charges in dark places and transport charges generated in charge generation layers during light reception.

The photosensitive layers are generally formed by coating conductive substrates with coating liquids where charge generation materials and charge transport materials, and resin binders are dissolved or dispersed in organic solvents.

Recent electrophotographic apparatuses are mainly digital machines where monochromatic rays such as argon, helium-neon, semiconductor laser or light-emitting diodes are adopted as exposure light sources, and information such as images and characters is digitized and converted into optical signals to charge photoconductors and such photoconductors are irradiated with light to thereby form electrostatic latent images on photoconductor surfaces and then visualize such images by toners.

Methods for charging photoconductors include non-contact charging systems where charging members such as scorotron and photoconductors are not in contact with each other, and contact charging systems where charging members such as semi-conductive rubber rollers and brushes, and photoconductors are in contact with each other. In particular, contact charging systems, where corona discharge occurs in the immediate vicinity of photoconductors as compared with non-contact charging systems, thus have the features of less causing the occurrence of ozone and allowing for low applied voltages. Accordingly, contact charging systems are mainly adopted particularly in medium-size or small-size apparatuses because of enabling electrophotographic apparatuses more compact, lower in cost, and lower in environmental contamination to be realized.

However, in electrophotographic apparatuses provided with charging apparatuses of contact charging systems, high electric fields may be locally applied onto defect sites of photoconductors in contact charging, thereby resulting in electric pinholes sometimes leading to image defects.

As photoconductors where such image defects can be prevented, electrophotographic photoconductors are known which have uniform thicknesses and in which undercoat layers capable of covering unevenness of conductive substrate surfaces are provided.

Undercoat layers used include not only anode oxidation films and boehmite films of aluminum, but also resin films of polyvinyl alcohol, casein, polyvinylpyrrolidone, polyacrylic acid, gelatin, polyurethane, polyamide, and the like.

Such resin films also can contain particles of metal oxides such as titanium oxide and zinc oxide, as fillers, for the purpose of preventing image failures occurring due to fringe patterns by suppression of reflection of excessive exposure light from conductive substrates and for the purpose of appropriate adjustment of resistance values of undercoat layers.

In recent years, charge generation substances for use in high-sensitive electrophotographic photoconductors have been actively developed. For example, Y-type titanyl phthalocyanine known as a high-sensitive charge generation substance has the maximum peak at a Bragg angle 2θ of 27.2±0.2° in a powder X-ray diffraction spectrum. Such Y-type titanyl phthalocyanine has been found to be reduced in photon efficiency by dehydration treatment in dry inert gas, and is again increased in photon efficiency when left to still stand in the normal-temperature and normal-humidity environment and absorbs water again. Thus, one reason why the Y-type titanyl phthalocyanine exhibits a high photon efficiency is presumed because the Y-type titanyl phthalocyanine has a crystal structure containing a water molecule and the water molecule promotes dissociation between an exciton hole and an electron each generated by light. Accordingly, a photoconductor with such Y-type titanyl phthalocyanine as a charge generation substance has a concern about the change in sensitivity characteristics due to the variation in environment, particularly, the variation in humidity. In particular, the disadvantage of such large humidity dependence of sensitivity has been increasingly problematic in recent years along with progression of higher image qualities in digital copiers.

An attempt to add any other polar group instead of a water molecule, to Y-type titanyl phthalocyanine, has been made in order to solve the problem of such humidity dependence of sensitivity, and, for example, Patent Document 1 has disclosed synthesis of 1,2-butanediol adduct titanyl phthalocyanine. Patent Document 2 has disclosed synthesis of 2,3-butanediol adduct titanyl phthalocyanine. In particular, as those exhibiting particularly excellent properties, Patent Documents 3 and 4 each have disclosed 2,3-butanediol adduct titanyl phthalocyanine having stereoregularity, and furthermore, in particular, Patent Document 5 has reported a mixed crystal of 2,3-butanediol adduct titanyl phthalocyanine and titanyl phthalocyanine having no adduct, as one exhibiting high sensitivity. While the humidity dependence of sensitivity can be kept low in each case of use of such titanyl phthalocyanine compounds, Patent Documents 1 to 5, on the contrary, each do not suppose any method for sufficiently suppressing transfer ghost under a condition of a stronger transfer history. In particular, in recent years, in the case of a higher transfer voltage and a stronger transfer history along with an increase in apparatus speed or in the case of a transfer voltage set as high as about 1 kV to 2 kV for addressing to a cleaner-less process, a phenomenon has occurred where any image failure (transfer ghost) remarkably appears by the accumulation of reverse polarity space charges on a photosensitive layer and the influence on chargeability during the next rotation process.

RELATED ART DOCUMENTS

Patent Documents

[Patent Document 1] JPH05-257308A
[Patent Document 2] JPH05-273775A
[Patent Document 3] JPH07-173405A
[Patent Document 4] JPH08-82942A
[Patent Document 5] JPH09-230615A

SUMMARY OF THE INVENTION

Problems to be Solved by the Invention

As described above, the techniques disclosed in these Patent Documents cannot satisfy all the requirements for photoconductors: a high sensitivity, humidity dependence kept low, and a stable image obtained, under a condition of stronger transfer history.

An object of the present invention is to provide an electrophotographic photoconductor where, even when the electrophotographic photoconductor is mounted on an electrophotographic apparatus where the transfer voltage is set as high as about 1 kV to 2 kV for a high-speed process or a cleaner-less process, not only the stability of the potential retention rate of a photoconductor surface before and after repeated printing duration is maintained, but also an increase in surface residual potential is sufficiently suppressed and the respective variations in charge potentials at a low temperature and a low humidity and at a high temperature and a high humidity are kept small, and furthermore transfer ghost hardly occurs and a stable image can be obtained, as well as a method of manufacturing the same and an electrophotographic apparatus.

Means for Solving the Problems

The present inventors have made intensive studies, and as a result, have found that an electrophotographic photoconductor capable of achieving the above object can be provided by not only using a zinc oxide particle surface-treated with an N-acylated amino acid or its salt, as a filler of an undercoat layer of a photoconductor, singly or in combination with another metal oxide at a specified ratio but also using an adduct compound of titanyl phthalocyanine and butanediol, as a high-sensitive material of a photosensitive layer. Specifically, the present inventors have found that a favorable electrophotographic photoconductor is obtained by application of the following configuration, thereby leading to completion of the present invention.

In other words, a first aspect of the present invention provides an electrophotographic photoconductor including a conductive substrate and an undercoat layer and a photosensitive layer sequentially provided on the conductive substrate, wherein the photosensitive layer is a negatively-charged stacked type having a charge generation layer and a charge transport layer, the undercoat layer contains a resin binder and a first filler, the first filler contains a zinc oxide particle surface-treated with an N-acylated amino acid or an N-acylated amino acid salt, and the charge generation layer contains an adduct compound of titanyl phthalocyanine and butanediol.

Preferably, the undercoat layer further contains a second filler, and the second filler contains at least one metal oxide particle different from the zinc oxide particle surface-treated with an N-acylated amino acid or anN-acylated amino acid salt.

In addition, the adduct compound of titanyl phthalocyanine and butanediol preferably contains one or more selected from the group consisting of an adduct compound of titanyl phthalocyanine and 1,2-butanediol, an adduct compound of titanyl phthalocyanine and 2,3-butanediol, and their optical isomers.

Furthermore, the metal oxide particle includes one or more metal oxides selected from the group consisting of zinc oxide, titanium oxide, tin oxide, zirconium oxide, silicon oxide, copper oxide, magnesium oxide, antimony oxide, vanadium oxide, yttrium oxide, and niobium oxide.

Moreover, the second filler preferably contains a titanium oxide particle surface-treated with an aminosilane compound.

Moreover, the first and the second fillers preferably contain 2% by mass or more of the zinc oxide particle surface-treated with an N-acylated amino acid or an N-acylated amino acid salt.

Moreover, an average primary particle size of the zinc oxide particle is preferably 1 nm to 350 nm.

Moreover, the resin binder preferably contains two or more selected from the group consisting of an acrylic resin, a melamine resin, and a polyvinyl phenol resin.

Moreover, a mass ratio between a filler containing the first filler and the resin binder in the undercoat layer is preferably 50/50 to 90/10.

A second aspect of the present invention provides a method of manufacturing the electrophotographic photoconductor including the steps of preparing an undercoat layer coating liquid containing the zinc oxide particle surface-treated with an N-acylated amino acid or its salt, using the undercoat layer coating liquid to thereby form the undercoat layer on the conductive substrate, preparing a charge generation layer coating liquid containing the adduct compound of titanyl phthalocyanine and butanediol, and using the charge generation layer coating liquid to thereby form the charge generation layer on the undercoat layer.

A third aspect of the present invention provides an electrophotographic apparatus including the electrophotographic photoconductor.

Effects of the Invention

It is revealed that, according to the present invention, the above configurations are adopted to thereby provide an electrophotographic photoconductor where, even when the electrophotographic photoconductor is mounted on an electrophotographic apparatus where the transfer voltage is set high for a high-speed process or a cleaner-less process, not only the stability of the potential retention rate of a photoconductor surface before and after repeated printing duration is maintained, but also an increase in surface residual potential is sufficiently suppressed and the respective variations in charge potentials at a low temperature and a low humidity and at a high temperature and a high humidity are kept small, and furthermore transfer ghost hardly occurs and a stable image can be obtained, as well as a method of manufacturing the same and an electrophotographic apparatus.

According to the present invention, an electrophotographic photoconductor can be made where, even when the electrophotographic photoconductor is mounted on an electrophotographic apparatus where the transfer voltage is set high for a high-speed process or a cleaner-less process, transfer ghost hardly occurs. The reason for this is presumed because the above-described undercoat layer can be adopted to thereby allow for an enhancement in the hole transport ability of the undercoat layer, and allow for a decrease in the amount of hole trapping derived from the undercoat layer even in the case of a higher transfer voltage, thereby allowing the amount of reduction in surface charge potential in the next process to be decreased. The undercoat layer can be used to thereby increase the dispersion stability of an undercoat layer coating liquid and suppress the occurrence of a secondary aggregate due to the dispersion of metal oxide in the undercoat layer, thereby realizing a photoconductor not causing any black spot, ground fogging, and the like on a blank sheet, as image defects derived from such a secondary aggregate. Furthermore, an adduct compound of titanyl phthalocyanine and butanediol can be contained in a photosensitive layer to thereby keep small respective variations in charge potentials at low temperature and low humidity and at high temperature and high humidity even in the case of a high transfer voltage, and allow a higher-quality photoconductor to be provided.

Therefore, according to a combination of an undercoat layer and a photosensitive layer each having the above-described configurations, an electrophotographic photoconductor is obtained where not only the stability of the potential retention rate of a photoconductor surface before and after repeated printing duration is maintained, but also an increase in surface residual potential is sufficiently suppressed and the respective variations in charge potentials at low temperature and low humidity and at high temperature and high humidity are kept small, and furthermore transfer ghost hardly occurs and a stable image can be obtained.

MODE FOR CARRYING OUT THE INVENTION

Hereinafter, embodiments of the present invention are described in detail with reference to the drawings. The present invention is not limited by the following description at all.

Figure 1:
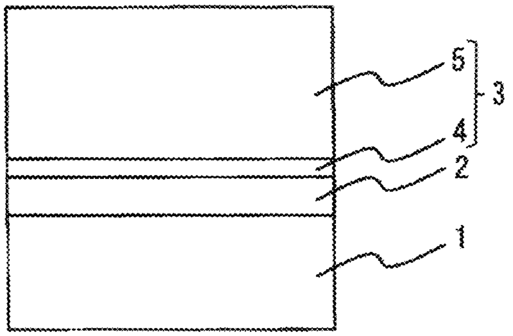
FIG. 1 is a schematic cross-sectional view illustrating one configuration example of the negatively-charged stacked electrophotographic photoconductor of the present invention.

As described above, an electrophotographic photoconductor of an embodiment of the present invention is a negatively-charged stacked photoconductor as a stacked (function separated) photoconductor. FIG. 1 is a schematic cross-sectional view illustrating one configuration example of the negatively-charged stacked electrophotographic photoconductor of the present invention.

As illustrated, in the negatively-charged stacked photoconductor, an undercoat layer 2, and a photosensitive layer 3 including a charge generation layer 4 having a charge generation function and a charge transport layer 5 having a charge transport function are sequentially stacked on a conductive substrate 1. The "photosensitive layer" in the present invention is a stacked photosensitive layer where a charge generation layer and a charge transport layer are stacked. For example, a protective layer (not illustrated) may be, if necessary, provided on the photosensitive layer for the purpose of an enhancement in printing durability, or the like.

In a photoconductor of an embodiment of the present invention, not only the undercoat layer 2 contains a resin binder and a first filler, and the first filler contains a zinc oxide particle surface-treated with an N-acylated amino acid or an N-acylated amino acid salt, but also the charge generation layer 4 contains an adduct compound of titanyl phthalocyanine and butanediol. Such a configuration can be adopted to thereby allow the predetermined effects of the present invention to be obtained as described above.

The undercoat layer 2 may further contain a second filler in addition to the first filler and the second filler may contain at least one metal oxide particle different from the zinc oxide particle surface-treated with an N-acylated amino acid or an N-acylated amino acid salt. It is presumed that, when the second filler is included, the amount of hole trapping derived from the undercoat layer 2 is further reduced and the amount of reduction in surface charge potential is further decreased. In this case, the undercoat layer 2 may contain a zinc oxide particle surface-treated with an N-acylated amino acid or its salt, and at least one other metal oxide particle different therefrom, within a specified ratio.

(Zinc Oxide Particle Surface-Treated with N-Acylated Amino Acid or its Salt)

The N-acylated amino acid for use in the surface treatment of the zinc oxide particle is configured from an amino acid moiety and a fatty acid moiety. Examples of the amino acid in the amino acid moiety include glycine, α-alanine, valine, leucine, isoleucine, serine, threonine, lysine, arginine, aspartic acid, glutamic acid, asparagine, glutamine, cysteine, cystine, methionine, phenylalanine, tyrosine, proline, hydroxyproline, tryptophan, histidine, β-alanine, ε-aminocaproic acid, sarcosine, and DL-pyroglutamic acid. The fatty acid in the fatty acid moiety may be any of saturated or unsaturated fatty acid, and in particular, is preferably a fatty acid having 8 to 20 carbon atoms, and examples thereof include lauric acid, myristic acid, palmitic acid, stearic acid, oleic acid, and coconut oil fatty acid.

Examples of the N-acylated amino acid include lauroyl glutamic acid, myristoyl glutamic acid, coconut oil fatty acid glutamic acid (also referred to as "cocoyl glutamic acid"), stearoyl glutamic acid, lauroyl aspartic acid, lauroyl sarcosine, myristoyl sarcosine, coconut oil fatty acid sarcosine, N-lauryl-N-methyl-β-alanine, cocoyl alanine, N-myristoyl- N-methyl-β-alanine, N-coconut oil fatty acid-N-methyl-β-alanine, and cocoyl glycine. In particular, cocoyl glutamic acid is preferable.

In addition, the N-acylated amino acid salt is not particularly limited, and is preferably a metal salt, an ammonium salt, or an organic amine salt. Examples of the metal atom constituting the metal salt include monovalent metals such as sodium, lithium, potassium, rubidium, and cesium; divalent metals such as zinc, magnesium, calcium, strontium, and barium; trivalent metals such as aluminum; and other metals such as iron and titanium. Examples of the organic amine group constituting the organic amine salt include alkanolamine groups such as a monoethanolamine group, a diethanolamine group, and a triethanolamine group; alkylamine groups such as a monoethylamine group, a diethylamine group, and a triethylamine group; and polyamine groups such as an ethylenediamine group and a triethylenediamine group. Among the above salts, an ammonium salt, a sodium salt, and a potassium salt are more preferable, and a sodium salt is further preferable. Accordingly, the N-acylated amino acid salt is particularly preferably a sodium cocoyl glutamate salt. It is presumed that the zinc oxide particle is surface-treated with the N-acylated amino acid or its salt and thus the amount of hole trapping derived from the undercoat layer 2 can be reduced even in the case of a higher transfer voltage and the amount of reduction in surface charge potential can be decreased, as compared with the case of surface treatment with a silane coupling agent.

Specific examples of the N-acylated amino acid or its salt include Aminosurfact (registered trademark) ACDS-L (aqueous sodium cocoyl glutamate salt solution), ACDP-L (aqueous potassium/sodium cocoyl glutamate salt solution), ACMT-L (aqueous cocoyl glutamic acid triethanolamine salt solution), ALMS-P1 (sodium lauroyl glutamate salt), and AMMS-P1 (sodium myristoyl glutamate salt), Amino-Former (registered trademark) FLDS-L (aqueous sodium lauroyl aspartate salt solution), FCMT-L (aqueous acyl aspartic acid triethanolamine salt solution), and FLMS-P1 (sodium lauroyl aspartate salt) manufactured by Asahi Kasei Finechem Co., Ltd., and Amisoft (registered trademark) HS-11P (sodium stearoyl glutamate salt), Amisoft (registered trademark) HA-P (stearoyl glutamic acid), Amisoft (registered trademark) MK-11 (potassium myristoyl glutamate salt), Amisoft (registered trademark) CA (cocoyl glutamic acid), Amisoft (registered trademark) CS-11 (sodium cocoyl glutamate salt), Amisoft (registered trademark) CS-22 (aqueous disodium/sodium cocoyl glutamate solution), and Amilight (registered trademark) ACS-12 (aqueous cocoyl alanine sodium salt solution) manufactured by Ajinomoto Co., Inc.

In addition, the surface treatment of the zinc oxide particle with the N-acylated amino acid or its salt is made by attachment of the N-acylated amino acid or its salt as a surface treatment agent onto a surface of the zinc oxide particle according to chemical adsorption or physical adsorption, and a surface treatment method conventionally used can be appropriately used as the method of the surface treatment and is not particularly limited. Specific examples include a method (dry treatment method, mechanochemical method) involving directly mixing the N-acylated amino acid or its salt with the particle, a method (semi-dry method) involving dispersing the N-acylated amino acid or its salt in a dispersion medium and then mixing it with the particle, and a method (wet method) involving dispersing the particle in a dispersion medium to thereby produce a slurry and then mixing the slurry with the N-acylated amino acid or its salt.

The dry treatment method is a method for allowing the surface treatment agent to adsorb or be bonded to a particle surface by mechanochemical treatment, for example, by using an airflow ejection containing the surface treatment agent to thereby utilize an impact force, or by mixing a dispersion medium such as media and using a ball mill or the like to thereby utilize a shear force, in surface treatment of the particle.

The dispersion medium for use in the semi-dry method or the wet method is not particularly limited, and examples include water, an organic solvent, or a mixture thereof. Examples of the organic solvent include alcohol, acetone, dimethyl sulfoxide, dimethyl formamide, tetrahydrofuran, and dioxane, and examples of the alcohol include monohydric water-soluble alcohols such as methanol, ethanol, and propanol, and di- or more hydric water-soluble alcohols such as ethylene glycol and glycerin. The dispersion medium is preferably water, more preferably ion-exchange water.

In the semi-dry method and the wet method, the particle and the surface treatment agent are dispersed in the solvent, and surface treatment is performed. A known method may be adopted as the dispersion method and is not particularly limited. The dispersion can also be performed by, for example, stirring in a tank, and can be preferably performed with a dispersion machine which can be used for the dispersion of the particle in a liquid, for example, a disper mixer, a homomixer, an inline mixer, a media grinder, a triple roll, an attritor, a colloid mill, or an ultrasonic dispersion machine.

It is preferable in the surface treatment to sufficiently stir the particle and the surface treatment agent so that a state where these are uniformly mixed is achieved. In a case where a mixer is used in the dry method and the semi-dry method, specifically, for example, Powder Lab (volume 130 ml) or FM mixer (volume 9 L) manufactured by Nippon Coke & Engineering Co., Ltd., can be used as the mixer, and the stirring is preferably made at an increased rotation speed. The stirring time may be any time as long as uniform mixing is made and the surface treatment progresses, and it is preferably 10 minutes or more, and from the viewpoint of productivity, within 10 hours is preferable. The rotation speed in the stirring is preferably 1000 rpm or more, and the rotation speed is more preferably 2000 rpm or more. If the rotation speed is 500 rpm or less, the surface treatment is not sufficient in some cases. The temperature during the surface treatment is not particularly limited, and is preferably 5 to 150° C., more preferably 60 to 150° C., for example, in terms of operational reasons.

The amount of particle, surface treatment agent, solvent, and dispersion medium during each such surface treatment is not particularly limited as long as the desired surface treatment can be performed. Specifically, loss of the surface treatment agent may occur during the treatment or after the treatment, and thus the amount of the N-acylated amino acid or its salt based on 100 parts by mass of the zinc oxide particle is preferably, for example, 0.1 to 15 parts by mass. The amount of the N-acylated amino acid or its salt based on 100 parts by mass of the zinc oxide particle is more preferably 0.2 to 12 parts by mass, further preferably 0.5 to 10 parts by mass.

In addition, the temperature during the treatment is not particularly limited as long as the desired surface treatment is performed, and it is preferable in the wet method to produce a slurry and then age the slurry at 60° C. or more. The aging temperature is more preferably 80° C. or more, further preferably 90° C. or more. The upper limit of the aging temperature is preferably 200° C. or less in order to inhibit an amino acid from being degraded. The upper limit of the aging temperature is more preferably 150° C. or less, further preferably 130° C. or less. The slurry is preferably aged with stirring.

The aging time is not particularly limited and is preferably 1 minute or more, more preferably 5 minutes or more, further preferably 10 minutes or more. The upper limit of the aging time is not particularly limited, and is preferably, for example, 10 hours or less from the viewpoint of an enhancement in production efficiency. The upper limit of the aging time is more preferably 5 hours or less, further preferably 2 hours or less.

In the wet method, it is suitable to remove the dispersion medium after aging the slurry. If necessary, any other step to be performed in usual particle surface treatment or the like, for example, neutralization, washing, or pulverization may be further performed.

After the removal of the dispersion medium, drying is also suitable. Such drying includes, for example, vacuum drying or heat drying. When drying by heating, it is preferable to perform the drying at a temperature of 35° C. to 200° C. for 5 minutes to 72 hours. Drying is expected to further enhance the dispersibility of the zinc oxide particle surface-treated with the N-acylated amino acid or its salt.

In the surface treatment with the N-acylated amino acid or its salt, the surface treatment is preferably applied so that the content of the surface treatment agent is 0.1 to 15% by mass when the zinc oxide particle after the treatment is 100 parts by mass. The content of the surface treatment agent is set to 0.1% by mass or more and thus liquid stability can be favorably ensured and the occurrence of aggregation and precipitation over time can be suppressed. The content of the surface treatment agent is set to 15% by mass or less and thus electric characteristics of the photoconductor can be favorably ensured and the occurrence of a defective image can be suppressed. The content of the surface treatment agent is more preferably 0.2 to 9% by mass, further preferably 0.5 to 8% by mass.

The average primary particle size of the zinc oxide particle is preferably in the range from 1 to 800 nm, more suitably 1 to 350 nm, further suitably 10 to 300 nm. The average primary particle size of the zinc oxide particle is preferably 800 nm or less because coating liquid stability of an undercoat layer coating liquid is more favorable. Any manufacturing method according to various production processes conventionally known can be used as the method of manufacturing the zinc oxide particle. For example, a zinc oxide particle produced by the French method or the American method may also be used. The French method is a manufacturing method involving heating metallic zinc to provide zinc vapor and oxidizing and then cooling the zinc vapor. The American method is a manufacturing method involving air oxidizing metal vapor obtained by adding a reducing agent to zinc ore and subjecting them to heating, reduction and volatilization. Alternatively, a zinc oxide particle may be used which is obtained by a wet method involving roasting zinc hydroxide or basic zinc carbonate obtained by a reaction of soluble zinc (zinc chloride, zinc sulfate, or the like) and an alkaline solution (aqueous sodium hydroxide solution or the like) and precipitation of the resultant. Specifically, for example, FINEX-25, FINEX-30, FINEX-50, XZ-100F-LP, or XZ-300F-LP manufactured by Sakai Chemical Industry Co., Ltd., MZ-300 or MZ-500 manufactured by TAYCA CORPORATION, or FZO-50 manufactured by ISHIHARA SANGYO KAISHA, LTD. can be used.

(Metal Oxide Particle)

The metal oxide particle different from the zinc oxide particle surface-treated with the N-acylated amino acid or its salt, which can be further mixed as the second filler in the undercoat layer 2, means a metal oxide particle that is subjected to surface treatment different from that of the zinc oxide particle surface-treated with the N-acylated amino acid or its salt, a metal oxide particle which is different in material from that of the zinc oxide particle, or a combination thereof. Examples of such a metal oxide particle preferably include any particle made of one or more metal oxides selected from the group consisting of zinc oxide, titanium oxide, tin oxide, zirconium oxide, silicon oxide, copper oxide, magnesium oxide, antimony oxide, vanadium oxide, yttrium oxide and niobium oxide. In particular, a titanium oxide particle is preferable, and in particular, a titanium oxide particle subjected to surface treatment with a silane coupling agent is preferable because the amount of reduction in surface charge potential can be decreased. The average primary particle size of the titanium oxide particle is suitably 10 nm to 500 nm, more suitably 20 nm to 300 nm.

Examples of the silane coupling agent can preferably include an aminosilane compound, and examples can include aminosilane compounds such as N-β(aminoethyl)β-aminopropyltrimethoxysilane, γ-aminopropyltriethoxysilane, N-phenyl-γ-aminopropyltrimethoxysilane, N-2-(aminoethyl)-3-aminopropylmethyldimethoxysilane, N-2-(aminoethyl)-3-aminopropylmethyltrimethoxysilane, 3-aminopropyltrimethoxysilane, 3-aminopropylmethyltrimethoxysilane, 3-aminopropylmethyltriethoxysilane, 3-triethoxysilyl-N-(1,3-dimethyl-butylidene)propylamine, aminopropylmethyltrimethoxysilane, and N-phenyl-3-aminopropyltrimethoxysilane. Specifically, for example, a silane coupling agent KBM-603 (N-β(aminoethyl)γ-aminopropyltrimethoxysilane), KBE-903 (γ-aminopropyltriethoxysilane), KBM-573 (N-phenyl-γ-aminopropyltrimethoxysilane), KBM-602 (N-2-(aminoethyl)-3-aminopropylmethyldimethoxysilane), KBM-903 (3-aminopropyltrimethoxysilane), or KBE-9103P(3-triethoxysilyl-N-(1,3-dimethyl-butylidene)propylamine) manufactured by Shin-Etsu Chemical Co., Ltd., can be used.

In particular, a titanium oxide particle surface-treated with an aminosilane compound is preferably used as the metal oxide particle, and thus transfer ghost can be more effectively suppressed.

The method for surface treatment of the titanium oxide particle with the silane coupling agent preferably involves mechanochemically surface-treating the titanium oxide particle with the silane coupling agent according to a gas phase method. Specifically, the titanium oxide particle and the silane coupling agent are mixed by a blender such as a ball mill or a Henschel mixer, and are subsequently subjected to surface treatment with pulverization treatment by a jet flow type air pulverizer like a jet mill. The resulting titanium oxide surface-treated with the silane coupling agent can also be used as it is, or may be subjected to washing treatment with pure water and then used. The crystal type of titanium oxide may be any of an anatase type, a rutile type, a brookite type, and a mixed crystal type thereof.

The undercoat layer 2 may contain at least the first filler, and the first filler may contain the zinc oxide particle surface-treated with the N-acylated amino acid or its salt. In a case where the undercoat layer 2 further contains the second filler in addition to the zinc oxide particle surface-treated with the N-acylated amino acid or its salt, and the second filler contains at least one metal oxide particle different from the zinc oxide particle surface-treated with the N-acylated amino acid or its salt, 2% by mass or more of the zinc oxide particle surface-treated with the N-acylated amino acid or its salt is preferably included in the first filler and the second filler. The zinc oxide particle surface-treated with the N-acylated amino acid or its salt is more preferably included at 20% by mass or more, further preferably 40% by mass or more, based on the total amount of the fillers from the viewpoint of suppression of transfer ghost. In a case where the zinc oxide particle surface-treated with the N-acylated amino acid or its salt is not included as the filler in the undercoat layer 2, the effect of improving transfer ghost is not obtained.

(Adduct Compound of Titanyl Phthalocyanine and Butanediol)

One or more compounds selected from the group consisting of an adduct compound of titanyl phthalocyanine and 1,2-butanediol, an adduct compound of titanyl phthalocyanine and 2,3-butanediol, and their optical isomers can be used as an adduct compound of titanyl phthalocyanine and butanediol as a charge generation material for use in the charge generation layer 4. The Y-type titanyl phthalocyanine here has an influence on photon efficiency due to binding or separating of an atom of titanyl and an OH group of a water molecule in a different environment, and thus is increased or decreased in sensitivity. On the other hand, 1,2-butanediol or 2,3-butanediol has a high boiling point and has two OH groups in the same molecule, and thus the probability of separation from an atom of titanyl at the same time at two adsorption points is reduced. Therefore, one or more selected from the group consisting of an adduct compound of titanyl phthalocyanine and 1,2-butanediol, an adduct compound of titanyl phthalocyanine and 2,3-butanediol, and their optical isomers are preferably used from the viewpoint of suppression of the variation in sensitivity due to the environment. Here, the Y-type titanyl phthalocyanine or the like may also be added thereto.

Other configurations than the above, of a photoconductor of an embodiment of the present invention, are not particularly limited as long as the undercoat layer 2 and the charge generation layer 4 satisfy the above conditions about the filler and the charge generation material, and can be appropriately chosen according to an ordinary method. Hereinafter, the configuration of each layer of the photoconductor is described.

(Conductive Substrate)

The conductive substrate 1 has a role as an electrode of the photoconductor and also serves as a support of each layer constituting the photoconductor, and may have any shape of cylindrical, plate, and film shapes. The material of the conductive substrate 1 can be, for example, one obtained by subjecting a surface of a metal such as aluminum, stainless steel, or nickel, or glass or a resin, to conductive treatment.

(Undercoat Layer)

The undercoat layer 2 is required to contain the filler and the resin binder and satisfy the conditions about the filler as described above.

Any of resins such as polyethylene, polypropylene, polystyrene, an acrylic resin, a vinyl chloride resin, a vinyl acetate resin, polyurethane, an epoxy resin, polyester, a melamine resin, a silicone resin, polyvinyl butyral, polyamide, casein, gelatin, polyvinyl alcohol, a phenol resin, a polyvinyl phenol resin and ethyl cellulose can be used singly or as a mixture of two or more kinds thereof, in the resin binder of the undercoat layer 2. In particular, the resin binder in the undercoat layer 2 preferably contains two or more selected from the group consisting of an acrylic resin, a melamine resin and a polyvinyl phenol resin.

The mass ratio [filler/resin binder] between the filler including the first filler or the filler including the first filler and the second filler, and the resin binder, in the undercoat layer 2 is preferably 50/50 to 90/10. The ratio of the filler in the undercoat layer 2 is set to 50/50 or more and thus the ratio of the resin binder can be kept low to thereby suppress the occurrence of a low-density defective image due to a too high-volume resistivity of the undercoat layer 2 and thus no sufficient decrease in potential of an exposed section under the low temperature and low humidity environment. The ratio of the filler is set to 90/10 or less and thus stability of an undercoat layer coating liquid can be increased and the occurrence of aggregation and precipitation over time can be suppressed.

The undercoat layer 2 is mainly made of the filler and the resin, and a known additive may also be added thereto. Examples of such an additive can include known materials, for example, a metal powder of aluminum or the like, a conductive substance such as carbon black, an electron transporting substance such as an electron transporting pigment, a polycondensed compound, a metal chelate compound, and an organic metal compound. Examples of a preferable electron transporting substance include a benzophenone compound having a hydroxy group and an anthraquinone compound having a hydroxy group.

The undercoat layer coating liquid used to form the undercoat layer 2 is prepared by allowing the filler to be dispersed and contained in a resin solution where the resin binder is dissolved in a solvent. The solvent may be appropriately selected in consideration of dispersibility of the filler therein, solubility of the resin binder therein, and preservability, volatility, safety and the like thereof. Specific examples of the solvent include alcohols such as methanol, ethanol, n-propyl alcohol, isopropyl alcohol, n-butanol, t-butanol, sec-butanol and benzyl alcohol, toluene, cyclohexanone, tetrahydrofuran, and methylene chloride. A general-purpose apparatus such as a vibration mill, a paint shaker, or a sand grinder can be used for dispersion treatment of the filler, and zirconia is preferably used as a dispersion medium because more uniform dispersion can be made.

The thickness of the undercoat layer 2 is preferably in the range from 0.1 to 10 more suitably 0.3 to 5 further suitably 0.5 to 3 μm. The thickness of the undercoat layer 2 is set to 0.1 μm or more and thus charge injection can be properly suppressed and the occurrence of any black spot failure on an image can be suppressed. The thickness of the undercoat layer 2 is set to 10 μm or less and thus an increase in resistance can be suppressed and the occurrence of a defective image due to a low density can be suppressed.

While the undercoat layer 2 is used as a single layer, two or more different layers may be stacked and used. In this case, it is not necessary to allow all the layers to contain the zinc oxide particle surface-treated with the N-acylated amino acid or its salt, and, for example, a configuration may be adopted where an undercoat layer 2 made of only a thermoplastic resin such as alcohol-soluble nylon is stacked on an undercoat layer 2 containing the zinc oxide particle surface-treated with the N-acylated amino acid or its salt or where an undercoat layer 2 containing the zinc oxide particle surface-treated with the N-acylated amino acid or its salt is stacked on an undercoat layer 2 made of an anode oxidation film of aluminum.

(Photosensitive Layer)

As described above, the photosensitive layer 3 has the charge generation layer 4 and the charge transport layer 5 and the charge transport layer 5 is the outermost layer, in the negatively-charged stacked photoconductor. The charge generation layer 4 is required to satisfy the above conditions about the charge generation material, as described above.

The charge generation layer 4 can be formed by, for example, a method involving coating with a coating liquid where any particle of various organic pigments is dispersed as the charge generation material in the resin binder, and receives light to generate charge. For the charge generation layer 4, it is important to have a high electron generation efficiency and simultaneously injectability of charge generated, into the charge transport layer 5, and it is desirable that it is less in electric field dependence and has good injection even in a low electric field.

The adduct compound of titanyl phthalocyanine and butanediol, as the charge generation material, may be used singly or used in appropriate combination with other charge generation materials. As such other charge generation materials, phthalocyanine compounds such as X-type metal-free phthalocyanine, τ-type metal-free phthalocyanine, α-type titanyl phthalocyanine, β-type titanyl phthalocyanine, Y-type titanyl phthalocyanine, γ-type titanyl phthalocyanine, amorphous titanyl phthalocyanine, and ε-type copper phthalocyanine, various azo pigments, anthoanthorone pigments, thiapyrylium pigments, perylene pigments, perinone pigments, squarylium pigments, quinacridone pigments, and the like can be appropriately used in combination, and a suitable substance can be selected depending on the light wavelength region of an exposure light source for use in image formation. The charge generation layer 4 mainly includes the charge generation material, and a charge transport material or the like can also be added thereto and then used.

The resin binder of the charge generation layer 4 is not particularly limited, and polymers and copolymers, of a polycarbonate resin, a polyester resin, a polyamide resin, a polyurethane resin, a vinyl chloride resin, a vinyl acetate resin, a phenoxy resin, a polyvinyl acetal resin, a polyvinyl butyral resin, a polystyrene resin, a polysulfone resin, a diallyl phthalate resin, and a methacrylic acid ester resin can be appropriately combined and then used.

The charge generation layer coating liquid for use in formation of the charge generation layer 4 is prepared by dissolving and dispersing the charge generation material and the resin binder in a solvent. Examples of the solvent here used include tetrahydrofuran (THF), 1,3-dioxolane, tetrahydropyran, methyl ethyl ketone, methyl isobutyl ketone, cyclohexanone, toluene, methylene chloride, dichloromethane, 1,2-dichloroethane, chlorobenzene, ethylene glycol, ethylene glycol monomethyl ether, and 1,2-dimethoxyethane, and these can be used singly or as a mixture thereof. Preferably, 1,2-dimethoxyethane or a mixed solvent including it is used. The solvent can also be used in the same way for a charge transport layer coating liquid described below.

The content of the charge generation material in the charge generation layer 4 is suitably 20 to 80% by mass, more suitably 30 to 70% by mass based on the solid content in the charge generation layer 4. The content of the resin binder in the charge generation layer 4 is suitably 20 to 80% by mass, more suitably 30 to 70% by mass based on the solid content in the charge generation layer 4. The charge generation layer 4 may have a charge generation function, and thus the thickness thereof is determined by the coefficient of light absorption of the charge generation material and is generally 1 μm or less, suitably 0.5 μm or less.

The charge transport layer 5 is configured mainly from a charge transport material and a resin binder.

Examples of the resin binder in the charge transport layer 5, which can be here used, include various polycarbonate resins, polyarylate resins, polyphenylene resins, polyester resins, polyvinyl acetal resins, polyvinyl butyral resins, polyvinyl alcohol resins, vinyl chloride resins, vinyl acetate resins, polyethylene resins, polypropylene resins, acrylic resins, polyurethane resins, epoxy resins, melamine resins, silicone resins, polyamide resins, polystyrene resins, polyacetal resins, polysulfone resins, diallyl phthalate resins, and polymers and copolymers of methacrylic acid esters, of bisphenol A-type, bisphenol Z-type, bisphenol A-type-biphenyl copolymers, and bisphenol Z-type-biphenyl copolymers. Furthermore, the same kind of resins different in molecular weight can be mixed and then used.

Various hydrazone compounds, styryl compounds, diamine compounds, butadiene compounds, indole compounds, and the like can be used singly, or may be appropriately combined and mixed, and then used, as the charge transport material of the charge transport layer 5. For example, those represented by the following II-1 to II-14 can be exemplified as the charge transport material, but are not limited thereto.

II-1

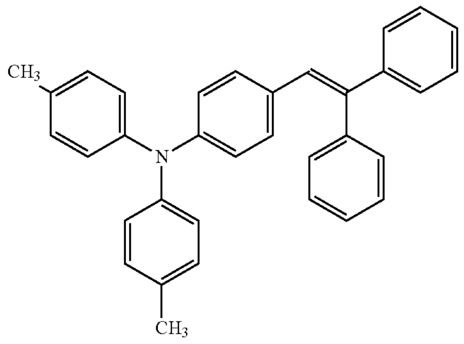

II-2

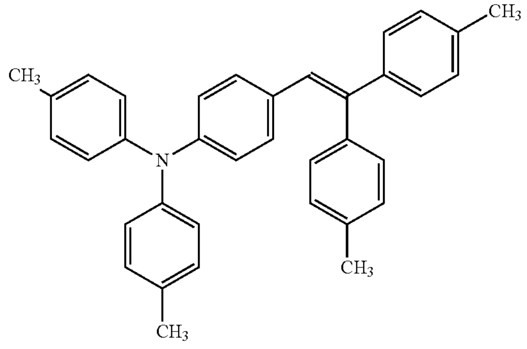

II-3

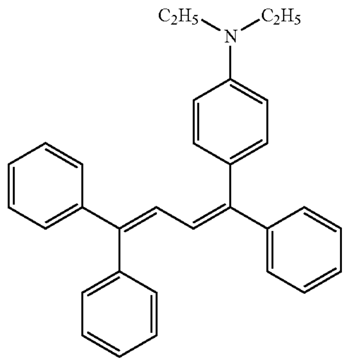

-continued
II-4
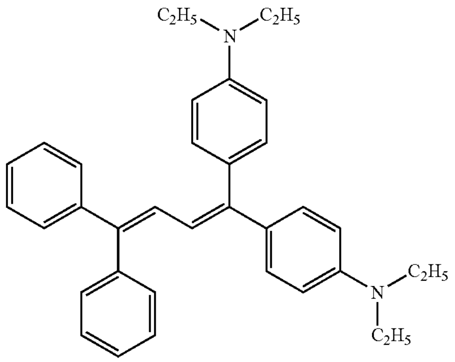
II-5
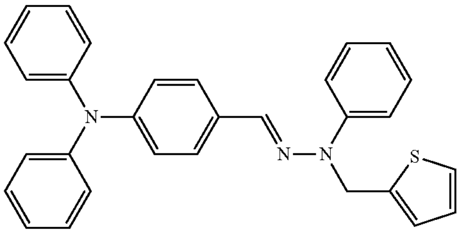
II-6
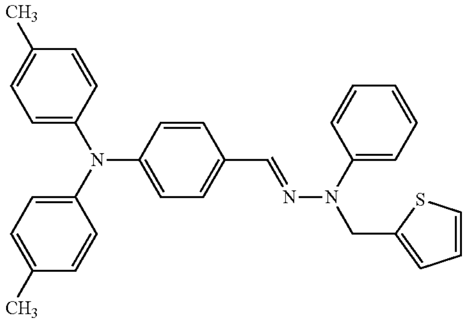
II-7
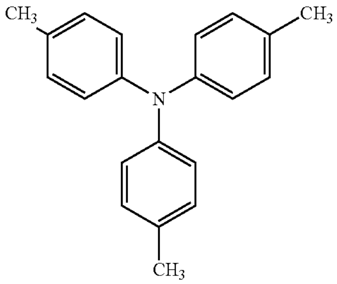
II-8
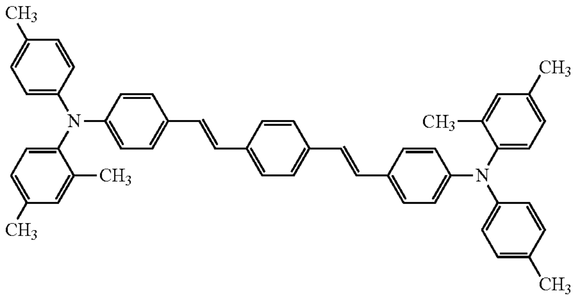
-continued
II-9
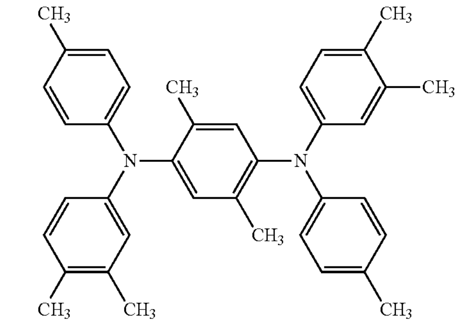
II-10
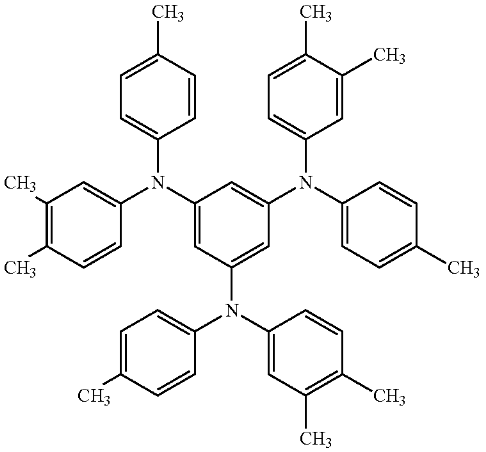
II-11
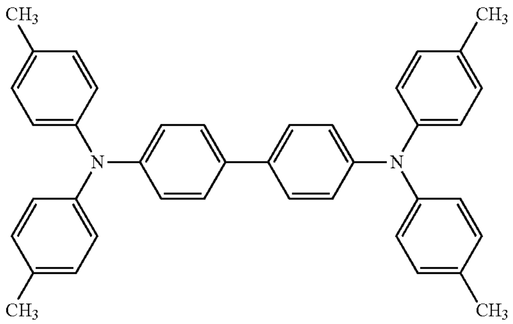
II-12
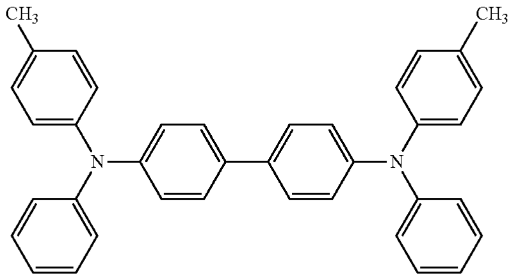

-continued

II-13

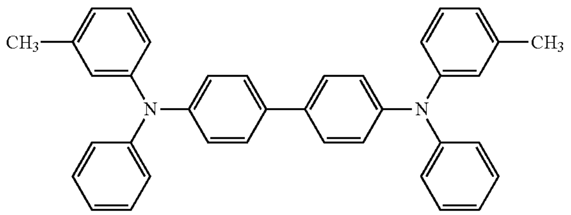

II-14

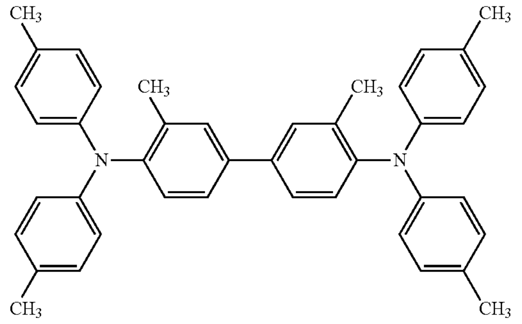

The content of the resin binder in the charge transport layer 5 is suitably 10 to 90% by mass, more suitably 20 to 80% by mass based on the solid content in the charge transport layer 5. The content of the charge transport material in the charge transport layer 5 is suitably 10 to 90% by mass, more suitably 20 to 80% by mass based on the solid content in the charge transport layer 5.

The thickness of the charge transport layer 5 is preferably in the range from 3 to 50 μm, more preferably in the range from 15 to 40 μm in order that a practically effective surface potential is maintained.

The photosensitive layer can contain a deterioration inhibitor such as an antioxidant and a light stabilizer for the purposes of enhancements in environmental resistance and stability against harmful light. Examples of a compound used for these purposes include chromanol derivatives and esterified compounds, polyaryl alkane compounds, hydroquinone derivatives, etherified compounds, dietherified compounds, benzophenone derivatives, benzotriazole derivatives, thioether compounds, phenylenediamine derivatives, phosphonic acid esters, phosphorus acid esters, phenol compounds, hindered phenol compounds, linear amine compounds, cyclic amine compounds, and hindered amine compounds.

In addition, the photosensitive layer can also contain a leveling agent such as silicone oil and fluorine-based oil for the purposes of an enhancement in leveling performance of a film formed and impartment of lubricity. Furthermore, the photosensitive layer may contain a fine particle of a metal oxide such as silicon oxide (silica), titanium oxide, zinc oxide, calcium oxide, aluminum oxide (alumina), or zirconium oxide, a metal sulfate salt such as barium sulfate or calcium sulfate, or metal nitride such as silicon nitride or aluminum nitride, or a fluorine-based resin particle or a fluorine-based comb-type graft-polymerized resin, such as an ethylene tetrafluoride resin, for the purposes of adjustment of the film hardness, a decrease in coefficient of friction, impar iment of lubricity, and the like. Moreover, any other known additives can also be, if necessary, contained as long as electrophotographic characteristics are not remarkably impaired.

(Method of Manufacturing Photoconductor)

A manufacturing method of an embodiment of the present invention, in manufacturing the photoconductor, includes the steps of preparing an undercoat layer coating liquid including the zinc oxide particle surface-treated with the N-acylated amino acid or its salt, using the undercoat layer coating liquid to thereby form the undercoat layer 2 on the conductive substrate 1, preparing a charge generation layer coating liquid including an adduct compound of titanyl phthalocyanine and butanediol, and using the charge generation layer coating liquid to thereby form the charge generation layer 4 on the undercoat layer 2.

The undercoat layer 2 can be formed by coating a surface of the conductive substrate 1 with the undercoat layer coating liquid prepared as above, and drying the resultant, according to an ordinary method. The charge generation layer 4 can be formed by coating a surface of the undercoat layer 2 with the charge generation layer coating liquid prepared as above, and drying the resultant, according to an ordinary method. The method for coating with such a coating liquid, here used, is a known method such as a dip coating method, a doctor blade method, a bar coater, a roll transfer method, or a spray method, and a dip coating method is preferably used in coating of a cylindrical conductive substrate. The method for drying a coating film by the coating liquid can be appropriately selected depending on the type of the solvent and the thickness of a film to be formed, and in particular, thermal drying is preferable. The drying conditions can be, for example, 50 to 200° C. and 1 to 120 minutes.

In a manufacturing method of an embodiment of the present invention, specifically, the undercoat layer 2 is first formed by coating a surface of the conductive substrate 1 with the undercoat layer coating liquid including the specified filler, prepared as above, and drying the resultant, according to an ordinary method. Next, the charge generation layer 4 is formed by a method including a step of dissolving and dispersing the specified charge generation material and any resin binder in a solvent to thereby produce and prepare a charge generation layer coating liquid, and a step of coating a surface of the undercoat layer 2 with the charge generation layer coating liquid, and drying the resultant to thereby form the charge generation layer 4. Next, the charge transport layer 5 is formed by a method including a step of dissolving any charge transport material and resin binder in a solvent to thereby produce and prepare a charge transport layer coating liquid, and a step of coating a surface of the charge generation layer 4 with the charge transport layer coating liquid, and drying the resultant to thereby form the charge transport layer 5. A negatively-charged stacked photoconductor according to an embodiment of the present invention can be produced by such a manufacturing method.

(Electrophotographic Apparatus)

An electrophotographic apparatus of an embodiment of the present invention is obtained by mounting the electrophotographic photoconductor, and thus can be an electrophotographic apparatus hardly causing transfer ghost even in a case where the transfer voltage is set high for a high-speed process or a cleaner-less process. An electrophotographic apparatus of an embodiment of the present invention achieves a predetermined effect by application of any of various machine processes. Specifically, a sufficient effect can be obtained also by a charging process such as a contact charging system using a charging member such as a roller or a brush, or a non-contact charging system using a charging member such as a corotron or a scorotron, and a development process such as a contact development system or a non-contact development system using a non-magnetic one component, a magnetic one component, two components, or the like.

Figure 2:
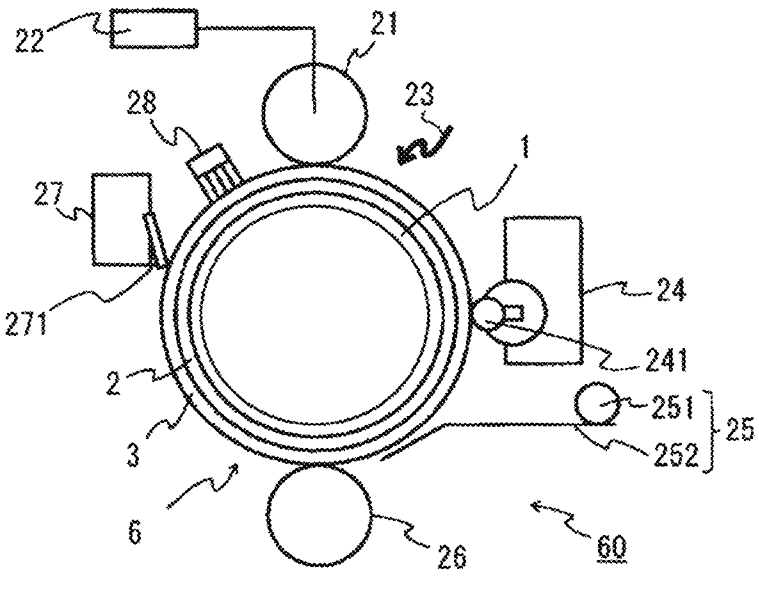
FIG. 2 is a schematic configuration diagram illustrating one configuration example of the electrophotographic apparatus of the present invention.

FIG. 2 illustrates a schematic configuration diagram of one configuration example of an electrophotographic apparatus of an embodiment of the present invention. An electrophotographic apparatus 60 illustrated includes a photoconductor 6 of an embodiment of the present invention, mounted therein, the photoconductor including a conductive substrate 1, and an undercoat layer 2 and a photosensitive layer 3 each covering a peripheral surface of the substrate. The electrophotographic apparatus 60 is configured from a charging member 21 placed on a peripheral edge of the photoconductor 6, a high-voltage power supply 22 supplying an applied voltage to the charging member 21, an image exposure member 23, a developer 24, a sheet-feeding member 25, and a transfer charger 26. The charging member 21 may be roller-shaped, the developer 24 may include a development roller 241, and the sheet-feeding member 25 may include a sheet-feeding roller 251 and a sheet-feeding guide 252. The transfer charger 26 may be of a direct charging type. The electrophotographic apparatus 60 may further include a cleaning apparatus 27 including a cleaning blade 271, and a discharging member 28. The electrophotographic apparatus 60 can be a color printer.

EXAMPLES

Hereinafter, specific aspects of the present invention are described in further detail with reference to Examples. The present invention is not limited by the following Examples without departing from the gist thereof.

<Method of Manufacturing Zinc Oxide Particle Surface-Treated>

(Production Example 1: Zinc Oxide Particle (20 nm) Surface-Treated with Amino Acid Salt A)

One hundred grams of a zinc oxide particle not surface-treated (FINEX-50 manufactured by Sakai Chemical Industry Co., Ltd., average primary particle size 20 nm) was placed in a mixer (Powder Lab manufactured by Nippon Coke & Engineering Co., Ltd., tank volume 130 ml), 50 g of an aqueous solution where 6 g of sodium cocoyl glutamate (Amisoft CS-11 manufactured by Ajinomoto Co., Inc.) (hereinafter, referred to as "amino acid salt A") as the surface treatment agent was dissolved and added thereto, and these were mixed at 2000 rpm for 10 minutes. Thereafter, the rotation speed was changed to a predetermined rotation speed of 2500 rpm, the interior of the tank was heated to a predetermined temperature of 100° C. with stirring, the volatile content such as water was removed at a negative pressure made by a vacuum pump, and thus a powder of a zinc oxide particle (20 nm) surface-treated with the amino acid salt A was obtained.

(Production Example 2: Zinc Oxide Particle (35 nm) Surface-Treated with Amino Acid Salt A)

The same manner as in Production Example 1 was made except that the zinc oxide particle not surface-treated (FINEX-50 manufactured by Sakai Chemical Industry Co., Ltd., average primary particle size 20 nm) was changed to a zinc oxide particle not surface-treated (FINEX-30 manufactured by Sakai Chemical Industry Co., Ltd., average primary particle size 35 nm), and thus a powder of a zinc oxide particle (35 nm) surface-treated with the amino acid salt A was obtained.

(Production Example 3: Zinc Oxide Particle (20 nm) Surface-Treated with Amino Acid Salt B)

The same manner as in Production Example 1 was made except that the surface treatment agent was changed to sodium lauroyl glutamate (AminoFormer ALMS-P1 manufactured by Asahi Kasei Finechem Co., Ltd.) (hereinafter, referred to as "amino acid salt B"), and thus a powder of a zinc oxide particle (20 nm) surface-treated with the amino acid salt B was obtained.

(Production Example 4: Zinc Oxide Particle (20 nm) Surface-Treated with Amino Acid C)

The same manner as in Production Example 1 was made except that the surface treatment agent was changed to stearoyl glutamic acid (Amisoft HA-P manufactured by Ajinomoto Co., Inc.) (hereinafter, referred to as "amino acid C"), and thus a powder of a zinc oxide particle (20 nm) surface-treated with the amino acid C was obtained.

(Production Example 5: Zinc Oxide Particle (20 nm) Surface-Treated with Amino Acid Salt D)

The same manner as in Production Example 1 was made except that the surface treatment agent was changed to a potassium myristoyl glutamate salt (Amisoft MK-11 manufactured by Ajinomoto Co., Inc.) (hereinafter, referred to as "amino acid salt D"), and thus a powder of a zinc oxide particle (20 nm) surface-treated with the amino acid D was obtained.

(Production Example 6: Titanium Oxide Particle (21 nm) Surface-Treated with Aminosilane)

Titanium oxide particles surface-treated with aminosilane were obtained by mechanochemically surface-treating a surface of 100 parts by mass of a titanium oxide particle not surface-treated (P25 manufactured by NIPPON AEROSIL CO., LTD., average primary particle size 21 nm), with 5 parts by mass of γ-aminopropyltriethoxysilane (KBE-903 manufactured by Shin-Etsu Chemical Co., Ltd.) (hereinafter, referred to as "aminosilane") as the surface treatment agent (silane coupling agent), by a gas phase method, and binding them was subjected to washing treatment with pure water, and sufficiently dried, and thus a powder of a titanium oxide particle (21 nm) surface-treated with aminosilane was obtained.

(Production Example 7: Zinc Oxide Particle (20 nm) Surface-Treated with Aminosilane)

The same manner as in Production Example 6 was made except that the titanium oxide particle not surface-treated (P25 manufactured by NIPPON AEROSIL CO., LTD., average primary particle size 21 nm) was changed to a zinc oxide particle not surface-treated (FINEX-50 manufactured by Sakai Chemical Industry Co., Ltd., average primary particle size 20 nm), and thus a powder of a zinc oxide particle (20 nm) surface-treated with aminosilane was obtained.

Next, the method of manufacturing the adduct compound of titanyl phthalocyanine and butanediol of the present invention is specifically exemplified.

Production Example 8: Adduct Compound of Titanyl Phthalocyanine and 1,2-Butanediol In 200 ml of o-dichlorobenzene was dispersed 29.2 g of 1,3-diiminoisoindoline, 20.4 g of titanium tetra-n-butoxide was added thereto, and the resultant was heated under a nitrogen atmosphere at 150 to 160° C. for 5 hours. After cooling, a crystal precipitate was isolated by filtration, washed with chloroform, washed with an aqueous 2% hydrochloric acid solution, washed with water, washed with methanol, and dried, and thereafter 26.2 g (91.0%) of crude titanyl phthalocyanine was obtained. Next, 20.0 g of the crude titanyl phthalocyanine was stirred and dissolved at 5° C. or less in 200 ml of concentrated sulfuric acid for 1 hour, and the resultant mixture was poured into 4 L of water at 20° C. A crystallized precipitate was isolated by filtration and sufficiently washed with water, and thus 180 g of a wet paste product was obtained. The product was dried and powdered, and the crystal type was an amorphous type. Next, 100 ml of o-dichlorobenzene and 50 ml of 1,2-butanediol were taken in a flask, and 8 g of a titanyl phthalocyanine-amorphous dry powder was added thereto. Next, the mixture was stirred at room temperature for 10 hours. The mixture was left to stand half a day and poured into 800 ml of methanol, and a crystal was precipitated. The crystallized precipitate was isolated by filtration, washed with methanol, and dried, and thus 8.4 g of an objective titanyl phthalocyanine crystal was obtained. The isolated titanyl phthalocyanine crystal had the maximum peak at a Bragg angle 2θ; 26.5 degrees, and additionally had peaks at 12.5 and 16.1 degrees.

Production Example 9: Adduct Compound of Titanyl Phthalocyanine and 2,3-Butanediol A crystal was prepared by the same method as in Production Example 8 except that 1,2-butanediol was replaced by 2,3-butanediol. The isolated crystals had peaks at Bragg angles 2θ; 8.5, 9.4, 12.3, 15.3, 19.1, 23.7, and 26.4 degrees.

Next, the existing Y-type titanyl phthalocyanine crystal and α-type titanyl phthalocyanine crystal were prepared for comparison.

Production Example 10: Y-Type Titanyl Phthalocyanine Crystal

To a beaker were added 60 ml of methyl ethyl ketone and 20 ml of water, and 40 g (solid content 11%) of the titanyl phthalocyanine-wet paste product described in Production Example 8, and these were stirred at room temperature for 8 hours, and left to stand overnight. To this viscous mixture was added 500 ml of methanol, and thus a crystallized precipitate was obtained. The crystallized precipitate was isolated by filtration, washed with methanol, and dried, and 4.2 g of an objective titanyl phthalocyanine crystal (Y-type crystal) was obtained. The crystal was characterized by having peaks remarkably developed, at Bragg angles 2θ; 9.6 degrees and 27.4 degrees (Y-type crystal).

Production Example 11: α-Type Titanyl Phthalocyanine Crystal

Five grams of the titanyl phthalocyanine-amorphous dry powder described in Production Example 8 was suspended in 300 ml of acetic acid, and heated and refluxed for 8 hours. After still standing half a day, α-type titanyl phthalocyanine was taken by filtration. The crystal had the maximum peak at a Bragg angle 2θ; 7.9 degrees, and additionally had peaks at 22.8 and 28.8 degrees.

(Production of Negatively-Charged Stacked Photoconductor)

Example 1

A slurry was prepared by adding 48.0 parts by mass of a polyvinyl phenol resin (trade name: Marka Linker MH-2: manufactured by Maruzen Petrochemical Co., Ltd.) as the resin binder in the undercoat layer, 42.0 parts by mass of a melamine resin (trade name: U-VAN 2021: manufactured by Mitsui Chemicals, Inc., ratio of solid content 75%), and 239.0 parts by mass of the zinc oxide particle (20 nm) surface-treated with the amino acid salt A, obtained in Production Example 1, as the filler in the undercoat layer, to a mixed solvent of 1500.0 parts by mass of methanol and 300.0 parts by mass of butanol, as the solvent. The mass ratio (FB) between the filler and the resin binder in the slurry was 75/25. Five L of the resulting slurry was treated at a flow rate of a treatment liquid, of 300 ml, and a peripheral disc speed of 4 m/s for 20 paths by use of a disc-type bead mill packed with φ0.3-mm zirconia beads at a bulk packing ratio of 80 v/v % based on the vessel volume, and thus an undercoat layer coating liquid was obtained.

A cylindrical aluminum substrate as a conductive substrate 1 was dip coated with the undercoat layer coating liquid prepared, and thus an undercoat layer 2 was formed. The dry thickness of the undercoat layer 2 obtained by drying under conditions of a drying temperature of 135° C. and a drying time of 20 minutes was 1.5 μm.

Next, 1 part by mass of the adduct compound of titanyl phthalocyanine and 1,2-butanediol, synthesized in Production Example 8, as the charge generation material, and 1.5 parts by mass of a polyvinyl butyral resin (trade name "S-LEC BM-2" manufactured by Sekisui Chemical Co., Ltd.) as the resin binder were dissolved and dispersed in 60 parts by mass of dichloromethane, and thus a charge generation layer coating liquid was prepared. The undercoat layer 2 was dip coated with the charge generation layer coating liquid. A charge generation layer 4 having a thickness of 0.3 was formed by drying at a temperature of 80° C. for 30 minutes.

Next, 10 parts by mass of a compound represented by the following II-1, as the charge transport material, and 10 parts by mass of a polycarbonate resin (Iupizeta PCZ-500 manufactured by Mitsubishi Gas Chemical Company, Inc.) as the resin binder were dissolved in 80 parts by mass of dichloromethane. After dissolution, 0.1 parts by mass of a silicone oil (KP-340 manufactured by Shin-Etsu Polymer Co., Ltd.) was added, and thus a charge transport layer coating liquid was prepared. The charge generation layer 4 was dip coated with the charge transport layer coating liquid prepared, and dried at a temperature of 90° C. for 60 minutes, to thereby form a charge transport layer 5 having a thickness of 25 μm and thus an electrophotographic photoconductor was prepared.

II-1

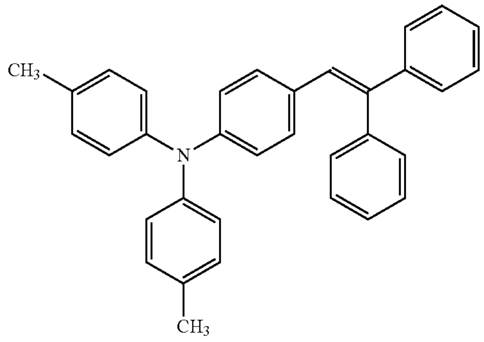

Example 2

An electrophotographic photoconductor was prepared by the same method as in Example 1 except that the adduct compound of titanyl phthalocyanine and 1,2-butanediol, obtained in Production Example 8, as the charge generation material in Example 1 was changed to the adduct compound of titanyl phthalocyanine and 2,3-butanediol, obtained in Production Example 9.

Example 3

An electrophotographic photoconductor was prepared by the same method as in Example 1 except that 1 part by mass of the adduct compound of titanyl phthalocyanine and 1,2-butanediol, obtained in Production Example 8, as the charge generation material in Example 1 was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 4

An electrophotographic photoconductor was prepared by the same method as in Example 1 except that 1 part by mass of the adduct compound of titanyl phthalocyanine and 1,2-butanediol, obtained in Production Example 8, as the charge generation material in Example 1 was changed to 0.8 parts by mass of the adduct compound of titanyl phthalocyanine and 2,3-butanediol, obtained in Production Example 9, and 0.2 parts by mass of the Y-type titanyl phthalocyanine obtained in Production Example 10.

Example 5

An electrophotographic photoconductor was prepared by the same method as in Example 1 except that the zinc oxide particle surface-treated with the amino acid salt A, obtained in Production Example 1, as the filler in the undercoat layer in Example 1 was changed to the zinc oxide particle surface-treated with the amino acid salt B, obtained in Production Example 3.

Example 6

An electrophotographic photoconductor was prepared by the same method as in Example 3 except that the zinc oxide particle surface-treated with the amino acid salt A, obtained in Production Example 1, as the filler in the undercoat layer in Example 3, was changed to the zinc oxide particle surface-treated with the amino acid salt B, obtained in Production Example 3.

Example 7

An electrophotographic photoconductor was prepared by the same method as in Example 1 except that the zinc oxide particle surface-treated with the amino acid salt A, obtained in Production Example 1, as the filler in the undercoat layer in Example 1, was changed to the zinc oxide particle surface-treated with the amino acid salt C, obtained in Production Example 4.

Example 8

An electrophotographic photoconductor was prepared by the same method as in Example 3 except that the zinc oxide particle surface-treated with the amino acid salt A, obtained in Production Example 1, as the filler in the undercoat layer in Example 3, was changed to the zinc oxide particle surface-treated with the amino acid salt C, obtained in Production Example 4.

Example 9

An electrophotographic photoconductor was prepared by the same method as in Example 1 except that the zinc oxide particle surface-treated with the amino acid salt A, obtained in Production Example 1, as the filler in the undercoat layer in Example 1, was changed to the zinc oxide particle surface-treated with the amino acid salt D, obtained in Production Example 5.

Example 10

An electrophotographic photoconductor was prepared by the same method as in Example 3 except that the zinc oxide particle surface-treated with the amino acid salt A, obtained in Production Example 1, as the filler in the undercoat layer in Example 3, was changed to the zinc oxide particle surface-treated with the amino acid salt D, obtained in Production Example 5.

Example 11

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (20 nm) surface-treated with the amino acid salt A, obtained in Production Example 1, as the first filler (F1), and 119.5 parts by mass of the titanium oxide particle (21 nm) surface-treated with aminosilane, obtained in Production Example 6, as the second filler (F2) (F1/F2=50/50).

Example 12

An electrophotographic photoconductor was prepared by the same method as in Example 11 except that the filler ratio (F1/F2) in the undercoat layer in Example 11 was changed to F1/F2=20/80, 47.8 parts by mass of the zinc oxide particle (20 nm) surface-treated with the amino acid salt A, obtained in Production Example 1, as the first filler (F1), and 191.2 parts by mass of the titanium oxide particle (21 nm) surface-treated with aminosilane, obtained in Production Example 6, as the second filler (F2).

Example 13

An electrophotographic photoconductor was prepared by the same method as in Example 11 except that the filler ratio (F1/F2) in the undercoat layer in Example 1 was changed to F1/F2=80/20, 191.2 parts by mass of the zinc oxide particle (20 nm) surface-treated with the amino acid salt A, obtained in Production Example 1, as the first filler (F1), and 47.8 parts by mass of the titanium oxide particle (21 nm) surface-treated with aminosilane, obtained in Production Example 6, as the second filler (F2).

Example 14

An electrophotographic photoconductor was prepared by the same method as in Example 11 except that the adduct compound of titanyl phthalocyanine and 1,2-butanediol, obtained in Production Example 8, as the charge generation material in Example 11, was changed to the adduct compound of titanyl phthalocyanine and 2,3-butanediol, obtained in Production Example 9.

Example 15

An electrophotographic photoconductor was prepared by the same method as in Example 12 except that the adduct compound of titanyl phthalocyanine and 1,2-butanediol, obtained in Production Example 8, as the charge generation material in Example 12, was changed to the adduct compound of titanyl phthalocyanine and 2,3-butanediol, obtained in Production Example 9.

Example 16

An electrophotographic photoconductor was prepared by the same method as in Example 13 except that the adduct compound of titanyl phthalocyanine and 1,2-butanediol, obtained in Production Example 8, as the charge generation material in Example 13 was changed to the adduct compound of titanyl phthalocyanine and 2,3-butanediol, obtained in Production Example 9.

Example 17

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (20 nm) surface-treated with the amino acid salt A, obtained in Production Example 1, as the first filler (F1), and 119.5 parts by mass of the zinc oxide particle (20 nm) surface-treated with the amino acid salt B, obtained in Production Example 3, as the second filler (F2)(F1/F2=50/50).

Example 18

An electrophotographic photoconductor was prepared by the same method as in Example 17 except that the filler ratio (F1/F2) in the undercoat layer in Example 17 was changed to F1/F2=20/80, 47.8 parts by mass of the zinc oxide particle (20 nm) surface-treated with the amino acid salt A, obtained in Production Example 1, as the first filler (F1), and 191.2 parts by mass of the zinc oxide particle (20 nm) surface-treated with the amino acid salt B, obtained in Production Example 3, as the second filler (F2).

Example 19

An electrophotographic photoconductor was prepared by the same method as in Example 17 except that the filler ratio (F1/F2) in the undercoat layer in Example 17 was changed to F1/F2=80/20, 191.2 parts by mass of the zinc oxide particle (20 nm) surface-treated with the amino acid salt A, obtained in Production Example 1, as the first filler (F1), and 47.8 parts by mass of the zinc oxide particle (20 nm) surface-treated with the amino acid salt B, obtained in Production Example 3, as the second filler (F2).

Example 20

An electrophotographic photoconductor was prepared by the same method as in Example 17 except that the adduct compound of titanyl phthalocyanine and 1,2-butanediol, obtained in Production Example 8, as the charge generation material in Example 17, was changed to the adduct compound of titanyl phthalocyanine and 2,3-butanediol, obtained in Production Example 9.

Example 21

An electrophotographic photoconductor was prepared by the same method as in Example 18 except that the adduct compound of titanyl phthalocyanine and 1,2-butanediol, obtained in Production Example 8, as the charge generation material in Example 18, was changed to the adduct compound of titanyl phthalocyanine and 2,3-butanediol, obtained in Production Example 9.

Example 22

An electrophotographic photoconductor was prepared by the same method as in Example 19 except that the adduct compound of titanyl phthalocyanine and 1,2-butanediol, obtained in Production Example 8, as the charge generation material in Example 19, was changed to the adduct compound of titanyl phthalocyanine and 2,3-butanediol, obtained in Production Example 9.

Example 23

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (35 nm) surface-treated with the amino acid salt A, obtained in Production Example 2, as the first filler (F1), and 119.5 parts by mass of the titanium oxide particle (21 nm) surface-treated with aminosilane, obtained in Production Example 6, as the second filler (F2) (F1/F2=50/50).

Example 24

An electrophotographic photoconductor was prepared by the same method as in Example 23 except that the filler ratio (F1/F2) in the undercoat layer in Example 23 was changed to F1/F2=20/80, 47.8 parts by mass of the zinc oxide particle (35 nm) surface-treated with the amino acid salt A, obtained in Production Example 2, as the first filler (F1), and 191.2 parts by mass of the titanium oxide particle (21 nm) surface-treated with aminosilane, obtained in Production Example 6, as the second filler (F2).

Example 25

An electrophotographic photoconductor was prepared by the same method as in Example 23 except that the filler ratio (F1/F2) in the undercoat layer in Example 23 was changed to F1/F2=80/20, 191.2 parts by mass of the zinc oxide particle (35 nm) surface-treated with the amino acid salt A, obtained in Production Example 2, as the first filler (F1), and 47.8 parts by mass of the titanium oxide particle (21 nm) surface-treated with aminosilane, obtained in Production Example 6, as the second filler (F2).

Example 26

An electrophotographic photoconductor was prepared by the same method as in Example 23 except that the adduct compound of titanyl phthalocyanine and 1,2-butanediol, obtained in Production Example 8, as the charge generation material in Example 23, was changed to the adduct compound of titanyl phthalocyanine and 2,3-butanediol, obtained in Production Example 9.

Example 27

An electrophotographic photoconductor was prepared by the same method as in Example 24 except that the adduct compound of titanyl phthalocyanine and 1,2-butanediol, obtained in Production Example 8, as the charge generation material in Example 24, was changed to the adduct compound of titanyl phthalocyanine and 2,3-butanediol, obtained in Production Example 9.

Example 28

An electrophotographic photoconductor was prepared by the same method as in Example 25 except that the adduct compound of titanyl phthalocyanine and 1,2-butanediol, obtained in Production Example 8, as the charge generation material in Example 25, was changed to the adduct compound of titanyl phthalocyanine and 2,3-butanediol, obtained in Production Example 9.

Example 29

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (35 nm) surface-treated with the amino acid salt A, obtained in Production Example 2, as the first filler (F1), and 119.5 parts by mass of the zinc oxide particle (20 nm) surface-treated with the amino acid salt B, obtained in Production Example 3, as the second filler (F2) (F1/F2=50/50).

Example 30

An electrophotographic photoconductor was prepared by the same method as in Example 29 except that the filler ratio (F1/F2) in the undercoat layer in Example 29 was changed to F1/F2=20/80, 47.8 parts by mass of the zinc oxide particle (35 nm) surface-treated with the amino acid salt A, obtained in Production Example 2, as the first filler (F1), and 191.2 parts by mass of the zinc oxide particle (20 nm) surface-treated with the amino acid salt B, obtained in Production Example 3, as the second filler (F2).

Example 31

An electrophotographic photoconductor was prepared by the same method as in Example 29 except that the filler ratio (F1/F2) in the undercoat layer in Example 29 was changed to F1/F2=80/20, 191.2 parts by mass of the zinc oxide particle (35 nm) surface-treated with the amino acid salt A, obtained in Production Example 2, as the first filler (F1), and 47.8 parts by mass of the zinc oxide particle (20 nm) surface-treated with the amino acid salt B, obtained in Production Example 3, as the second filler (F2).

Example 32

An electrophotographic photoconductor was prepared by the same method as in Example 29 except that the adduct compound of titanyl phthalocyanine and 1,2-butanediol, obtained in Production Example 8, as the charge generation material in Example 29, was changed to the adduct compound of titanyl phthalocyanine and 2,3-butanediol, obtained in Production Example 9.

Example 33

An electrophotographic photoconductor was prepared by the same method as in Example 30 except that the adduct compound of titanyl phthalocyanine and 1,2-butanediol, obtained in Production Example 8, as the charge generation material in Example 30, was changed to the adduct compound of titanyl phthalocyanine and 2,3-butanediol, obtained in Production Example 9.

Example 34

An electrophotographic photoconductor was prepared by the same method as in Example 31 except that the adduct compound of titanyl phthalocyanine and 1,2-butanediol, obtained in Production Example 8, as the charge generation material in Example 31, was changed to the adduct compound of titanyl phthalocyanine and 2,3-butanediol, obtained in Production Example 9.

Example 35

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (20 nm) surface-treated with the amino acid salt B, obtained in Production Example 3, as the first filler (F1), and 119.5 parts by mass of the titanium oxide particle (21 nm) surface-treated with aminosilane, obtained in Production Example 6, as the second filler (F2) (F1/F2=50/50).

Example 36

An electrophotographic photoconductor was prepared by the same method as in Example 35 except that the adduct compound of titanyl phthalocyanine and 1,2-butanediol, obtained in Production Example 8, as the charge generation material in Example 35, was changed to the adduct compound of titanyl phthalocyanine and 2,3-butanediol, obtained in Production Example 9.

Example 37

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (20 nm) surface-treated with the amino acid salt B, obtained in Production Example 3, as the first filler (F1), and 119.5 parts by mass of the zinc oxide particle (20 nm) surface-treated with the amino acid salt C, obtained in Production Example 4, as the second filler (F2) (F1/F2=50/50).

Example 38

An electrophotographic photoconductor was prepared by the same method as in Example 37 except that the adduct compound of titanyl phthalocyanine and 1,2-butanediol, obtained in Production Example 8, as the charge generation material in Example 37, was changed to the adduct compound of titanyl phthalocyanine and 2,3-butanediol, obtained in Production Example 9.

Example 39

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (20 nm) surface-treated with the amino acid salt C, obtained in Production Example 4, as the first filler (F1), and 119.5 parts by mass of the titanium oxide particle (21 nm) surface-treated with aminosilane, obtained in Production Example 6, as the second filler (F2) (F1/F2=50/50).

Example 40

An electrophotographic photoconductor was prepared by the same method as in Example 39 except that the adduct compound of titanyl phthalocyanine and 1,2-butanediol, obtained in Production Example 8, as the charge generation material in Example 39, was changed to the adduct compound of titanyl phthalocyanine and 2,3-butanediol, obtained in Production Example 9.

Example 41

An electrophotographic photoconductor was prepared by the same method as in Example 1 except that the zinc oxide particle surface-treated with the amino acid salt A, obtained in Production Example 1, as the filler in the undercoat layer in Example 1, was changed to 119.5 parts by mass of the zinc oxide particle (20 nm) surface-treated with the amino acid salt C, obtained in Production Example 4, as the first filler (F1), and 119.5 parts by mass of the zinc oxide particle (20 nm) surface-treated with the amino acid salt D, obtained in Production Example 5, as the second filler (F2) (F1/F2=50/50).

Example 42

An electrophotographic photoconductor was prepared by the same method as in Example 41 except that the adduct compound of titanyl phthalocyanine and 1,2-butanediol, obtained in Production Example 8, as the charge generation material in Example 41, was changed to the adduct compound of titanyl phthalocyanine and 2,3-butanediol, obtained in Production Example 9.

Example 43

An electrophotographic photoconductor was prepared by the same method as in Example 11 except that 1 part by mass of the adduct compound of titanyl phthalocyanine and 1,2-butanediol, obtained in Production Example 8, as the charge generation material in Example 11, was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 44

An electrophotographic photoconductor was prepared by the same method as in Example 12 except that 1 part by mass of the adduct compound of titanyl phthalocyanine and 1,2-butanediol, obtained in Production Example 8, as the charge generation material in Example 12, was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 45

An electrophotographic photoconductor was prepared by the same method as in Example 13 except that 1 part by mass of the adduct compound of titanyl phthalocyanine and 1,2-butanediol, obtained in Production Example 8, as the charge generation material in Example 13 was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 46

An electrophotographic photoconductor was prepared by the same method as in Example 11 except that 1 part by mass of the adduct compound of titanyl phthalocyanine and 1,2-butanediol, obtained in Production Example 8, as the charge generation material in Example 11, was changed to 0.8 parts by mass of the adduct compound of titanyl phthalocyanine and 2,3-butanediol, obtained in Production Example 9, and 0.2 parts by mass of the Y-type titanyl phthalocyanine obtained in Production Example 10.

Example 47

An electrophotographic photoconductor was prepared by the same method as in Example 17 except that 1 part by mass of the adduct compound of titanyl phthalocyanine and 1,2-butanediol, obtained in Production Example 8, as the charge generation material in Example 17, was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 48

An electrophotographic photoconductor was prepared by the same method as in Example 17 except that 1 part by mass of the adduct compound of titanyl phthalocyanine and 1,2-butanediol, obtained in Production Example 8, as the charge generation material in Example 17, was changed to 0.8 parts by mass of the adduct compound of titanyl phthalocyanine and 2,3-butanediol, obtained in Production Example 9, and 0.2 parts by mass of the Y-type titanyl phthalocyanine obtained in Production Example 10.

Example 49

An electrophotographic photoconductor was prepared by the same method as in Example 23 except that 1 part by mass of the adduct compound of titanyl phthalocyanine and 1,2-butanediol, obtained in Production Example 8, as the charge generation material in Example 23, was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 50

An electrophotographic photoconductor was prepared by the same method as in Example 23 except that 1 part by mass of the adduct compound of titanyl phthalocyanine and 1,2-butanediol, obtained in Production Example 8, as the charge generation material in Example 23, was changed to 0.8 parts by mass of the adduct compound of titanyl phthalocyanine and 2,3-butanediol, obtained in Production Example 9, and 0.2 parts by mass of the Y-type titanyl phthalocyanine obtained in Production Example 10.

Example 51

An electrophotographic photoconductor was prepared by the same method as in Example 29 except that 1 part by mass of the adduct compound of titanyl phthalocyanine and 1,2-butanediol, obtained in Production Example 8, as the charge generation material in Example 29, was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Example 52

An electrophotographic photoconductor was prepared by the same method as in Example 29 except that 1 part by mass of the adduct compound of titanyl phthalocyanine and 1,2-butanediol, obtained in Production Example 8, as the charge generation material in Example 29, was changed to 0.8 parts by mass of the adduct compound of titanyl phthalocyanine and 2,3-butanediol, obtained in Production Example 9, and 0.2 parts by mass of the Y-type titanyl phthalocyanine obtained in Production Example 10.

Example 53

An electrophotographic photoconductor was prepared by the same method as in Example 11 except that 1 part by mass of the adduct compound of titanyl phthalocyanine and 1,2-butanediol, obtained in Production Example 8, as the charge generation material in Example 11, was changed to 0.8 parts by mass of the adduct compound of titanyl phthalocyanine and 2,3-butanediol, obtained in Production Example 9, and 0.2 parts by mass of the α-type titanyl phthalocyanine obtained in Production Example 11 and furthermore the compound represented by II-1, as the charge transport material, was changed to a compound represented by the following II-8.

II-8

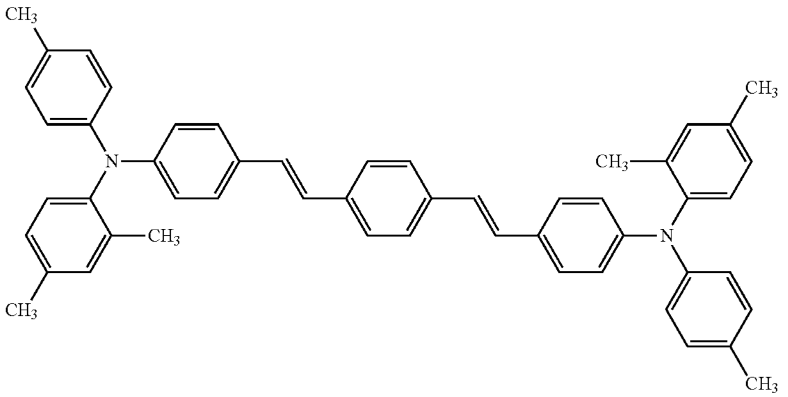

Comparative Example 1

An electrophotographic photoconductor was prepared by the same method as in Example 1 except that the zinc oxide particle surface-treated with the amino acid salt A, obtained in Production Example 1, as the filler in the undercoat layer in Example 1, was changed to the zinc oxide particle (20 nm) surface-treated with aminosilane, obtained in Production Example 7.

Comparative Example 2

An electrophotographic photoconductor was prepared by the same method as in Comparative Example 1 except that the adduct compound of titanyl phthalocyanine and 1,2-butanediol, obtained in Production Example 8, as the charge generation material in Comparative Example 1, was changed to the adduct compound of titanyl phthalocyanine and 2,3-butanediol, obtained in Production Example 9.

Comparative Example 3

An electrophotographic photoconductor was prepared by the same method as in Comparative Example 1 except that 1 part by mass of the adduct compound of titanyl phthalocyanine and 1,2-butanediol, obtained in Production Example 8, as the charge generation material in Comparative Example 1 was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Comparative Example 4

An electrophotographic photoconductor was prepared by the same method as in Comparative Example 1 except that 1 part by mass of the adduct compound of titanyl phthalocyanine and 1,2-butanediol, obtained in Production Example 8, as the charge generation material in Comparative Example 1 was changed to 0.8 parts by mass of the adduct compound of titanyl phthalocyanine and 2,3-butanediol, obtained in Production Example 9, and 0.2 parts by mass of the Y-type titanyl phthalocyanine obtained in Production Example 10.

Comparative Example 5

An electrophotographic photoconductor was prepared by the same method as in Example 1 except that the zinc oxide particle surface-treated with the amino acid salt A, obtained in Production Example 1, as the filler in the undercoat layer in Example 1, was changed to the titanium oxide particle (21 nm) surface-treated with aminosilane, obtained in Production Example 6.

Comparative Example 6

An electrophotographic photoconductor was prepared by the same method as in Comparative Example 5 except that 1 part by mass of the adduct compound of titanyl phthalocyanine and 1,2-butanediol, obtained in Production Example 8, as the charge generation material in Comparative Example 5, was changed to 0.8 parts by mass of the adduct compound of titanyl phthalocyanine and 1,2-butanediol, obtained in Production Example 8, and 0.2 parts by mass of the Y-type titanyl phthalocyanine obtained in Production Example 10.

Comparative Example 7

An electrophotographic photoconductor was prepared by the same method as in Comparative Example 5 except that 1 part by mass of the adduct compound of titanyl phthalocyanine and 1,2-butanediol, obtained in Production Example 8, as the charge generation material in Comparative Example 5, was changed to 0.8 parts by mass of the adduct compound of titanyl phthalocyanine and 1,2-butanediol, obtained in Production Example 8, and 0.2 parts by mass of the α-type titanyl phthalocyanine obtained in Production Example 11.

Comparative Example 8

An electrophotographic photoconductor was prepared by the same method as in Comparative Example 5 except that 1 part by mass of the adduct compound of titanyl phthalocyanine and 1,2-butanediol, obtained in Production Example 8, as the charge generation material in Comparative Example 5, was changed to 0.8 parts by mass of the adduct compound of titanyl phthalocyanine and 2,3-butanediol, obtained in Production Example 9, and 0.2 parts by mass of the α-type titanyl phthalocyanine obtained in Production Example 11.

Comparative Example 9

An electrophotographic photoconductor was prepared by the same method as in Comparative Example 5 except that 1 part by mass of the adduct compound of titanyl phthalocyanine and 1,2-butanediol, obtained in Production Example 8, as the charge generation material in Comparative Example 5, was changed to 1 part by mass of the Y-type titanyl phthalocyanine obtained in Production Example 10.

Comparative Example 10

An electrophotographic photoconductor was prepared by the same method as in Example 1 except that 1 part by mass of the adduct compound of titanyl phthalocyanine and 1,2-butanediol, obtained in Production Example 8, as the charge generation material in Example 1, was changed to 1 part by mass of the Y-type titanyl phthalocyanine obtained in Production Example 10.

Comparative Example 11

An electrophotographic photoconductor was prepared by the same method as in Example 11 except that 1 part by mass of the adduct compound of titanyl phthalocyanine and 1,2-butanediol, obtained in Production Example 8, as the charge generation material in Example 11, was changed to 1 part by mass of the Y-type titanyl phthalocyanine obtained in Production Example 10.

Comparative Example 12

An electrophotographic photoconductor was prepared by the same method as in Example 5 except that 1 part by mass of the adduct compound of titanyl phthalocyanine and 1,2-butanediol, obtained in Production Example 8, as the charge generation material in Example 5, was changed to 1 part by mass of the Y-type titanyl phthalocyanine obtained in Production Example 10.

Comparative Example 13

An electrophotographic photoconductor was prepared by the same method as in Example 35 except that 1 part by mass of the adduct compound of titanyl phthalocyanine and 1,2-butanediol, obtained in Production Example 8, as the charge generation material in Example 35, was changed to 1 part by mass of the Y-type titanyl phthalocyanine obtained in Production Example 10.

(Evaluation of Photoconductor)

The photoconductors prepared in Examples 1 to 53 and Comparative Examples 1 to 13 described above were evaluated about electric characteristics before and after printing duration, potential stability in environmental variation, and transfer performance, by the following methods.

<Electric Characteristics Before and After Printing Duration>

Each of the electrophotographic photoconductors obtained in Examples 1 to 53 and Comparative Examples 1 to 13 was mounted on a black drum cartridge of a commercially available color printer (MultiXpress X7600 LX manufactured by Samsung Electronics Co., Ltd.), a test pattern at a printing rate of 1.1% was printed on 90000 sheets for A3 by use of a black toner, and electric characteristics (electric characteristics before and after printing duration) of each of the electrophotographic photoconductors were measured before and after printing.

A surface of each of the photoconductors was charged to −650 V by corona discharge in a dark place under the environment at a temperature 22° C. and a humidity of 50%, and thereafter the surface potential V0 immediately after charging was measured. Subsequently, the resultant was left to still stand in a dark place for 5 seconds, and thereafter the surface potential V5 was measured and the potential retention rate Vk5 (%) after 5 seconds after charging was determined according to the following calculation expression (1):

$$Vk5 = V5/V0 \times 100. \quad (1)$$

Next, each of the photoconductors was irradiated with exposure light at 1.0 μW/cm$^2$, the light being dispersed to 780 nm by use of a filter, with a halogen lamp as a light source, for 5 seconds from a time point where the surface potential reached −600 V, and the amount of exposure required for light attenuation until the surface potential reached −300 V was determined as E1/2 (μJ/cm$^2$) and the residual potential on the photoconductor surface after 5 seconds after exposure was determined as VL (V). The amount of reduction in retention rate ΔVk5 and the amount of increase in residual potential ΔVL were evaluated according to the following expressions.

$$\text{Amount of reduction in retention rate } \Delta Vk5 = Vk5 \text{ before printing} - Vk5 \text{ after printing for 90000 sheets}$$

$$\text{Amount of increase in residual potential } \Delta VL = VL \text{ after printing for 90000 sheets} - VL \text{ before printing}$$

ΔVk5 indicates the degree of reduction in retention rate before and after printing duration, and if the value is as large as 3.0 or more, the reduction in charge retention rate after printing duration is large and fogging (scumming) on a blank sheet easily occurs. The difference of Vk5 between before and after printing (ΔVk5) was less than 1.0 was indicated as •, between 1.0 and 3.0 as ○, between 3.0 and 5.0 as Δ, and 5.0 or more as ×.

ΔVL indicates the degree of increase in residual potential before and after printing duration, and if the value is large, the printing density is easily reduced. In particular, a value of 0.02 or more is not preferable because a reduction in printing density is increased. The printing density of an image was measured with a densitometer (GretagMacbeth RD-19I), and the difference of density between before and after printing was less than 0.02 was indicated as ○, between 0.02 and 0.05 as Δ, and 0.05 or more as ×.

<Evaluation of Potential Stability in Environmental Variation (Potential Characteristics in Environmental Variation)>

Each of the photoconductors obtained in Examples 1 to 53 and Comparative Examples 1 to 13 was loaded on a commercially available color printer (MultiXpress X7600 LX manufactured by Samsung Electronics Co., Ltd.), and the charge potential was measured at a high temperature of 32° C. and a high humidity of 80% RH, and at a low temperature of 10° C. and a low humidity of 20% RH. The difference between the charge potential at the high temperature and high humidity and the charge potential at the low temperature and low humidity was defined as the amount of variation, and the amount of variation was less than 30 V was indicated as ○, between 30 V and 60 V as Δ, and more than 60 V as ×. The amount of variation represents the variation in image quality due to the environment, and a variation of 30 V or more is not preferable because the shading of an image is caused. In Table 8 to Table 10, the "Potential stabilities at high temperature and high humidity and at low temperature and low humidity" indicates the variations.

<Transfer Performance>

The occurrence of ghost by transfer (transfer ghost) and the change in charge potential (difference in charge potential) were evaluated as performances about transfer of each of the photoconductors.

<<Transfer Ghost>>

Figure 4:
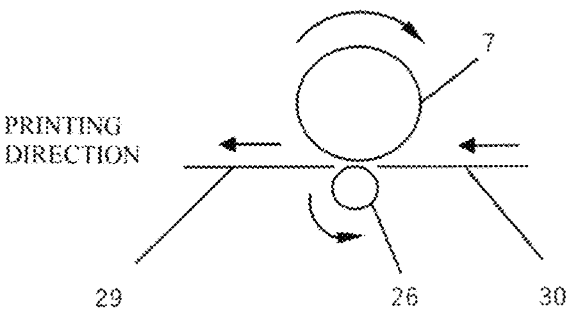
FIG. 4 is a diagram schematically illustrating a method for evaluating transfer ghosts in Examples.
Figure 4:
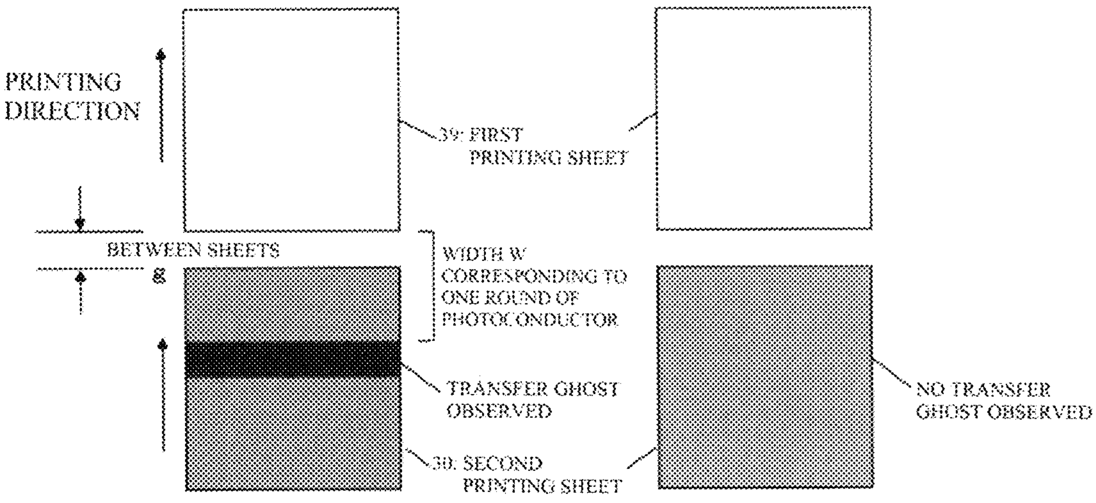

Each of the photoconductors obtained in Examples 1 to 53 and Comparative Examples 1 to 13 was mounted on a commercially available color printer (MultiXpress X7600 LX manufactured by Samsung Electronics Co., Ltd.), and a printed image was evaluated. FIG. 4 is a diagram schematically illustrating the evaluation method.

A sheet 29 and a sheet 30 are continuously inserted between a photoconductor 7 and a transfer charger 26 and a halftone image is printed on the second sheet 30 in a printer, as illustrated in FIG. 4A. When the second image is defined as the halftone, the difference in contrasting density appearing in the halftone image by the transfer voltage between the first sheet 29 and the second sheet 30 is defined as ghost by transfer (transfer ghost), as in illustrated in FIG. 4B. The transfer ghost appears as, for example, a band having a contrasting density with an interval W corresponding to one round of each of the photoconductors, from an end of the sheet 29. The width of the band corresponds to the distance between the sheet 29 and the sheet 30 (g between the sheets). FIG. 4C illustrates an example where no transfer ghost appears. Through such procedures, transfer ghosts were rated based on the following criteria:

- • represents a very favorable level with no transfer ghost observed;
- ○ represents a level with slightly minor transfer ghost not problematic in practical use;
- Δ represents a level with minor transfer ghost problematic in practical use; and
- × represents a level where transfer ghost is clearly visible.

<<Difference in Charge Potential>>

Figure 3:
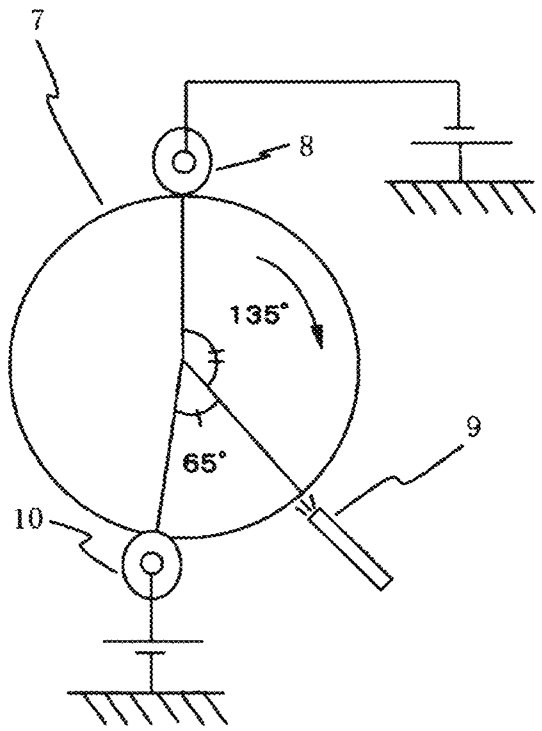
FIG. 3 is an illustration diagram illustrating a configuration of an electrophotographic apparatus used for the evaluation of the difference in charge potential in Examples.

Each of the photoconductors was placed according to an arrangement of the illustration diagram of the electrophotographic apparatus illustrated in FIG. 3, by use of an electric characteristic measurement system CYNTHIA 93 with a photosensitive drum, manufactured by GENTEC. In the drawing, symbol 7 represents a photoconductor, 8 represents a charging roller, 9 represents an electrometer, and 10 represents a transfer roller. The photoconductor 7 charged to ×600 V was rotated at a peripheral speed of 100 mm/s in an arrow direction in the drawing, where the member was rotated at a transfer voltage of 0 kV three times and subsequently rotated at an increased transfer voltage of 0.2 kV three times, and subsequently the transfer voltage was increased to 6.0 kV by 0.2 kV with respect to rotations three times. The difference (ΔV0) between the charge potential of the photoconductor at a transfer voltage of 0 kV and the charge potential during a period immediately after application of a transfer voltage of 6.0 kV was measured, and the degree of influence of transfer was measured. The trend of minor ghost which cannot be sensed by evaluation with a printer can be evaluated by applying a higher transfer voltage (6.0 kV) than that in a printer and measuring ΔV0. In a case where the difference ΔV0 in charge potential is small, transfer ghost in an image tends to hardly occur, and thus the degree of influence can be evaluated with the magnitude of ΔV0. ΔV0 has an influence on the difference in contrasting density appearing in the halftone image in transfer ghost evaluation, and thus is demanded to be 20 V or less.

The conditions of the fillers in the undercoat layers and the conditions of the charge generation materials in the charge generation layers, in Examples and Comparative Examples, are shown in Tables 1 to 3 below and Tables 4 to 7 below, respectively.

In addition, the evaluation results in respective Examples and Comparative Examples are shown in Tables 8 to 10 below.

TABLE 1

| | Composition of undercoat layer (UCL) | | | | | | |
|---|---|---|---|---|---|---|---|
| | First filler (F1) | | | Second filler (F2) | | | |
| | Type | Primary particle size (nm) | Surface treatment | Type | Primary particle size (nm) | Surface treatment | Filler ratio F1/F2 |
| Example 1 | Zinc oxide | 20 | Amino acid salt A | — | — | — | 100/0 |
| Example 2 | Zinc oxide | 20 | Amino acid salt A | — | — | — | 100/0 |
| Example 3 | Zinc oxide | 20 | Amino acid salt A | — | — | — | 100/0 |
| Example 4 | Zinc oxide | 20 | Amino acid salt A | — | — | — | 100/0 |
| Example 5 | Zinc oxide | 20 | Amino acid salt B | — | — | — | 100/0 |
| Example 6 | Zinc oxide | 20 | Amino acid salt B | — | — | — | 100/0 |
| Example 7 | Zinc oxide | 20 | Amino acid C | — | — | — | 100/0 |
| Example 8 | Zinc oxide | 20 | Amino acid C | — | — | — | 100/0 |
| Example 9 | Zinc oxide | 20 | Amino acid salt D | — | — | — | 100/0 |
| Example 10 | Zinc oxide | 20 | Amino acid salt D | — | — | — | 100/0 |
| Example 11 | Zinc oxide | 20 | Amino acid salt A | Titanium oxide | 21 | Aminosilane | 50/50 |
| Example 12 | Zinc oxide | 20 | Amino acid salt A | Titanium oxide | 21 | Aminosilane | 20/80 |
| Example 13 | Zinc oxide | 20 | Amino acid salt A | Titanium oxide | 21 | Aminosilane | 80/20 |
| Example 14 | Zinc oxide | 20 | Amino acid salt A | Titanium oxide | 21 | Aminosilane | 50/50 |
| Example 15 | Zinc oxide | 20 | Amino acid salt A | Titanium oxide | 21 | Aminosilane | 20/80 |
| Example 16 | Zinc oxide | 20 | Amino acid salt A | Titanium oxide | 21 | Aminosilane | 80/20 |
| Example 17 | Zinc oxide | 20 | Amino acid salt A | Zinc oxide | 20 | Amino acid salt B | 50/50 |
| Example 18 | Zinc oxide | 20 | Amino acid salt A | Zinc oxide | 20 | Amino acid salt B | 20/80 |
| Example 19 | Zinc oxide | 20 | Amino acid salt A | Zinc oxide | 20 | Amino acid salt B | 80/20 |
| Example 20 | Zinc oxide | 20 | Amino acid salt A | Zinc oxide | 20 | Amino acid salt B | 50/50 |
| Example 21 | Zinc oxide | 20 | Amino acid salt A | Zinc oxide | 20 | Amino acid salt B | 20/80 |
| Example 22 | Zinc oxide | 20 | Amino acid salt A | Zinc oxide | 20 | Amino acid salt B | 80/20 |

TABLE 2

| | Composition of undercoat layer (UCL) | | | | | | |
|---|---|---|---|---|---|---|---|
| | First filler (F1) | | | Second filler(F2) | | | |
| | Type | Primary particle size (nm) | Surface treatment | Type | Primary particle size (nm) | Surface treatment | Filler ratio F1/F2 |
| Example 23 | Zinc oxide | 35 | Amino acid salt A | Titanium oxide | 21 | Aminosilane | 50/50 |
| Example 24 | Zinc oxide | 35 | Amino acid salt A | Titanium oxide | 21 | Aminosilane | 20/80 |
| Example 25 | Zinc oxide | 35 | Amino acid salt A | Titanium oxide | 21 | Aminosilane | 80/20 |
| Example 26 | Zinc oxide | 35 | Amino acid salt A | Titanium oxide | 21 | Aminosilane | 50/50 |
| Example 27 | Zinc oxide | 35 | Amino acid salt A | Titanium oxide | 21 | Aminosilane | 20/80 |
| Example 28 | Zinc oxide | 35 | Amino acid salt A | Titanium oxide | 21 | Aminosilane | 80/20 |
| Example 29 | Zinc oxide | 35 | Amino acid salt A | Zinc oxide | 20 | Amino acid salt B | 50/50 |
| Example 30 | Zinc oxide | 35 | Amino acid salt A | Zinc oxide | 20 | Amino acid salt B | 20/80 |
| Example 31 | Zinc oxide | 35 | Amino acid salt A | Zinc oxide | 20 | Amino acid salt B | 80/20 |
| Example 32 | Zinc oxide | 35 | Amino acid salt A | Zinc oxide | 20 | Amino acid salt B | 50/50 |
| Example 33 | Zinc oxide | 35 | Amino acid salt A | Zinc oxide | 20 | Amino acid salt B | 20/80 |
| Example 34 | Zinc oxide | 35 | Amino acid salt A | Zinc oxide | 20 | Amino acid salt B | 80/20 |
| Example 35 | Zinc oxide | 20 | Amino acid salt B | Titanium oxide | 21 | Aminosilane | 50/50 |
| Example 36 | Zinc oxide | 20 | Amino acid salt B | Titanium oxide | 21 | Aminosilane | 50/50 |
| Example 37 | Zinc oxide | 20 | Amino acid salt B | Zinc oxide | 20 | Amino acid C | 50/50 |
| Example 38 | Zinc oxide | 20 | Amino acid salt B | Zinc oxide | 20 | Amino acid C | 50/50 |
| Example 39 | Zinc oxide | 20 | Amino acid C | Titanium oxide | 21 | Aminosilane | 50/50 |
| Example 40 | Zinc oxide | 20 | Amino acid C | Titanium oxide | 21 | Aminosilane | 50/50 |
| Example 41 | Zinc oxide | 20 | Amino acid C | Zinc oxide | 20 | Amino acid salt D | 50/50 |
| Example 42 | Zinc oxide | 20 | Amino acid C | Zinc oxide | 20 | Amino acid salt D | 50/50 |
| Example 43 | Zinc oxide | 20 | Amino acid salt A | Titanium oxide | 21 | Aminosilane | 50/50 |
| Example 44 | Zinc oxide | 20 | Amino acid salt A | Titanium oxide | 21 | Aminosilane | 20/80 |

TABLE 3

| | Composition of undercoat layer (UCL) | | | | | | |
|---|---|---|---|---|---|---|---|
| | First filler (F1) | | | Second filler (F2) | | | |
| | Type | Primary particle size (nm) | Surface treatment | Type | Primary particle size (nm) | Surface treatment | Filler ratio F1/F2 |
| Example 45 | Zinc oxide | 20 | Amino acid salt A | Titanium oxide | 21 | Aminosilane | 80/20 |
| Example 46 | Zinc oxide | 20 | Amino acid salt A | Titanium oxide | 21 | Aminosilane | 50/50 |
| Example 47 | Zinc oxide | 20 | Amino acid salt A | Zinc oxide | 20 | Amino acid salt B | 50/50 |
| Example 48 | Zinc oxide | 20 | Amino acid salt A | Zinc oxide | 20 | Amino acid salt B | 50/50 |
| Example 49 | Zinc oxide | 35 | Amino acid salt A | Titanium oxide | 21 | Aminosilane | 50/50 |
| Example 50 | Zinc oxide | 35 | Amino acid salt A | Titanium oxide | 21 | Aminosilane | 50/50 |

TABLE 3-continued

| | Composition of undercoat layer (UCL) | | | | | | |
|---|---|---|---|---|---|---|---|
| | First filler (F1) | | | Second filler (F2) | | | |
| | Type | Primary particle size (nm) | Surface treatment | Type | Primary particle size (nm) | Surface treatment | Filler ratio F1/F2 |
| Example 51 | Zinc oxide | 35 | Amino acid salt A | Zinc oxide | 20 | Amino acid salt B | 50/50 |
| Example 52 | Zinc oxide | 35 | Amino acid salt A | Zinc oxide | 20 | Amino acid salt B | 50/50 |
| Example 53 | Zinc oxide | 20 | Amino acid salt A | Titanium oxide | 21 | Aminosilane | 50/50 |
| Comparative Example 1 | Zinc oxide | 20 | Aminosilane | — | — | — | 100/0 |
| Comparative Example 2 | Zinc oxide | 20 | Aminosilane | — | — | — | 100/0 |
| Comparative Example 3 | Zinc oxide | 20 | Aminosilane | — | — | — | 100/0 |
| Comparative Example 4 | Zinc oxide | 20 | Aminosilane | — | — | — | 100/0 |
| Comparative Example 5 | Titanium oxide | 21 | Aminosilane | — | — | — | 100/0 |
| Comparative Example 6 | Titanium oxide | 21 | Aminosilane | — | — | — | 100/0 |
| Comparative Example 7 | Titanium oxide | 21 | Aminosilane | — | — | — | 100/0 |
| Comparative Example 8 | Titanium oxide | 21 | Aminosilane | — | — | — | 100/0 |
| Comparative Example 9 | Titanium oxide | 21 | Aminosilane | — | — | — | 100/0 |
| Comparative Example 10 | Zinc oxide | 20 | Amino acid salt A | — | — | — | 100/0 |
| Comparative Example 11 | Zinc oxide | 20 | Amino acid salt A | Titanium oxide | 21 | Aminosilane | 50/50 |
| Comparative Example 12 | Zinc oxide | 20 | Amino acid salt B | — | — | — | 100/0 |
| Comparative Example 13 | Zinc oxide | 20 | Amino acid salt B | Titanium oxide | 21 | Aminosilane | 50/50 |

TABLE 4

| | Composition of charge generation layer (CGL) | | | | Charge transport layer (CTL) |
|---|---|---|---|---|---|
| | CGM1 | CGM2 | CGM1/CGM2 | CGM/resin | CTM |
| Example 1 | Titanyl phthalocyanine-1,2-butanediol adduct compound | — | 100/0 | 40/60 | II-1 |
| Example 2 | Titanyl phthalocyanine-2,3-butanediol adduct compound | — | 100/0 | 40/60 | II-1 |
| Example 3 | Titanyl phthalocyanine-1,2-butanediol adduct compound | Y-type titanyl phthalocyanine | 80/20 | 40/60 | II-1 |
| Example 4 | Titanyl phthalocyanine-2,3-butanediol adduct compound | Y-type titanyl phthalocyanine | 80/20 | 40/60 | II-1 |
| Example 5 | Titanyl phthalocyanine-1,2-butanediol adduct compound | — | 100/0 | 40/60 | II-1 |
| Example 6 | Titanyl phthalocyanine-1,2-butanediol adduct compound | Y-type titanyl phthalocyanine | 80/20 | 40/60 | II-1 |
| Example 7 | Titanyl phthalocyanine-1,2-butanediol adduct compound | — | 100/0 | 40/60 | II-1 |
| Example 8 | Titanyl phthalocyanine-1,2-butanediol adduct compound | Y-type titanyl phthalocyanine | 80/20 | 40/60 | II-1 |
| Example 9 | Titanyl phthalocyanine-1,2-butanediol adduct compound | — | 100/0 | 40/60 | II-1 |
| Example 10 | Titanyl phthalocyanine-1,2-butanediol adduct compound | Y-type titanyl phthalocyanine | 80/20 | 40/60 | II-1 |
| Example 11 | Titanyl phthalocyanine-1,2-butanediol adduct compound | — | 100/0 | 40/60 | II-1 |
| Example 12 | Titanyl phthalocyanine-1,2-butanediol adduct compound | — | 100/0 | 40/60 | II-1 |
| Example 13 | Titanyl phthalocyanine-1,2-butanediol adduct compound | — | 100/0 | 40/60 | II-1 |

TABLE 4-continued

| | Composition of charge generation layer (CGL) | | | | Charge transport layer (CTL) |
|---|---|---|---|---|---|
| | CGM1 | CGM2 | CGM1/CGM2 | CGM/resin | CTM |
| Example 14 | Titanyl phthalocyanine-2,3-butanediol adduct compound | — | 100/0 | 40/60 | II-1 |
| Example 15 | Titanyl phthalocyanine-2,3-butanediol adduct compound | — | 100/0 | 40/60 | II-1 |
| Example 16 | Titanyl phthalocyanine-2,3-butanediol adduct compound | — | 100/0 | 40/60 | II-1 |
| Example 17 | Titanyl phthalocyanine-1,2-butanediol adduct compound | — | 100/0 | 40/60 | II-1 |

TABLE 5

| | Composition of charge generation layer (CGL) | | | | Charge transport layer (CTL) |
|---|---|---|---|---|---|
| | CGM1 | CGM2 | CGM1/CGM2 | CGM/resin | CTM |
| Example 18 | Titanyl phthalocyanine-1,2-butanediol adduct compound | — | 100/0 | 40/60 | II-1 |
| Example 19 | Titanyl phthalocyanine-1,2-butanediol adduct compound | — | 100/0 | 40/60 | II-1 |
| Example 20 | Titanyl phthalocyanine-2,3-butanediol adduct compound | — | 100/0 | 40/60 | II-1 |
| Example 21 | Titanyl phthalocyanine-2,3-butanediol adduct compound | — | 100/0 | 40/60 | II-1 |
| Example 22 | Titanyl phthalocyanine-2,3-butanediol adduct compound | — | 100/0 | 40/60 | II-1 |
| Example 23 | Titanyl phthalocyanine-1,2-butanediol adduct compound | — | 100/0 | 40/60 | II-1 |
| Example 24 | Titanyl phthalocyanine-1,2-butanediol adduct compound | — | 100/0 | 40/60 | II-1 |
| Example 25 | Titanyl phthalocyanine-1,2-butanediol adduct compound | — | 100/0 | 40/60 | II-1 |
| Example 26 | Titanyl phthalocyanine-2,3-butanediol adduct compound | — | 100/0 | 40/60 | II-1 |
| Example 27 | Titanyl phthalocyanine-2,3-butanediol adduct compound | — | 100/0 | 40/60 | II-1 |
| Example 28 | Titanyl phthalocyanine-2,3-butanediol adduct compound | — | 100/0 | 40/60 | II-1 |
| Example 29 | Titanyl phthalocyanine-1,2-butanediol adduct compound | — | 100/0 | 40/60 | II-1 |
| Example 30 | Titanyl phthalocyanine-1,2-butanediol adduct compound | — | 100/0 | 40/60 | II-1 |
| Example 31 | Titanyl phthalocyanine-1,2-butanediol adduct compound | — | 100/0 | 40/60 | II-1 |
| Example 32 | Titanyl phthalocyanine-2,3-butanediol adduct compound | — | 100/0 | 40/60 | II-1 |
| Example 33 | Titanyl phthalocyanine-2,3-butanediol adduct compound | — | 100/0 | 40/60 | II-1 |
| Example 34 | Titanyl phthalocyanine-2,3-butanediol adduct compound | — | 100/0 | 40/60 | II-1 |

TABLE 6

| | Composition of charge generation layer (CGL) | | | | Charge transport layer (CTL) |
|---|---|---|---|---|---|
| | CGM1 | CGM2 | CGM1/CGM2 | CGM/resin | CTM |
| Example 35 | Titanyl phthalocyanine-1,2-butanediol adduct compound | — | 100/0 | 40/60 | II-1 |
| Example 36 | Titanyl phthalocyanine-2,3-butanediol adduct compound | — | 100/0 | 40/60 | II-1 |

TABLE 6-continued

| | Composition of charge generation layer (CGL) | | | | Charge transport |
|---|---|---|---|---|---|
| | CGM1 | CGM2 | CGM1/ CGM2 | CGM/ resin | layer (CTL) CTM |
| Example 37 | Titanyl phthalocyanine-1,2-butanediol adduct compound | — | 100/0 | 40/60 | II-1 |
| Example 38 | Titanyl phthalocyanine-2,3-butanediol adduct compound | — | 100/0 | 40/60 | II-1 |
| Example 39 | Titanyl phthalocyanine-1,2-butanediol adduct compound | — | 100/0 | 40/60 | II-1 |
| Example 40 | Titanyl phthalocyanine-2,3-butanediol adduct compound | — | 100/0 | 40/60 | II-1 |
| Example 41 | Titanyl phthalocyanine-1,2-butanediol adduct compound | — | 100/0 | 40/60 | II-1 |
| Example 42 | Titanyl phthalocyanine-2,3-butanediol adduct compound | — | 100/0 | 40/60 | II-1 |
| Example 43 | Titanyl phthalocyanine-1,2-butanediol adduct compound | Y-type titanyl phthalocyanine | 80/20 | 40/60 | II-1 |
| Example 44 | Titanyl phthalocyanine-1,2-butanediol adduct compound | Y-type titanyl phthalocyanine | 80/20 | 40/60 | II-1 |
| Example 45 | Titanyl phthalocyanine-1,2-butanediol adduct compound | Y-type titanyl phthalocyanine | 80/20 | 40/60 | II-1 |
| Example 46 | Titanyl phthalocyanine-2,3-butanediol adduct compound | Y-type titanyl phthalocyanine | 80/20 | 40/60 | II-1 |
| Example 47 | Titanyl phthalocyanine-1,2-butanediol adduct compound | Y-type titanyl phthalocyanine | 80/20 | 40/60 | II-1 |
| Example 48 | Titanyl phthalocyanine-2,3-butanediol adduct compound | Y-type titanyl phthalocyanine | 80/20 | 40/60 | II-1 |
| Example 49 | Titanyl phthalocyanine-1,2-butanediol adduct compound | Y-type titanyl phthalocyanine | 80/20 | 40/60 | II-1 |
| Example 50 | Titanyl phthalocyanine-2,3-butanediol adduct compound | Y-type titanyl phthalocyanine | 80/20 | 40/60 | II-1 |
| Example 51 | Titanyl phthalocyanine-1,2-butanediol adduct compound | Y-type titanyl phthalocyanine | 80/20 | 40/60 | II-1 |

TABLE 7

| | Composition of charge generation layer (CGL) | | | | Charge transport |
|---|---|---|---|---|---|
| | CGM1 | CGM2 | CGM1/ CGM2 | CGM/ resin | layer (CTL) CTM |
| Example 52 | Titanyl phthalocyanine-2,3-butanediol adduct compound | Y-type titanyl phthalocyanine | 80/20 | 40/60 | II-1 |
| Example 53 | Titanyl phthalocyanine-2,3-butanediol adduct compound | α-type titanyl phthalocyanine | 80/20 | 40/60 | II-8 |
| Comparative Example 1 | Titanyl phthalocyanine-1,2-butanediol adduct compound | — | 100/0 | 40/60 | II-1 |
| Comparative Example 2 | Titanyl phthalocyanine-2,3-butanediol adduct compound | — | 100/0 | 40/60 | II-1 |
| Comparative Example 3 | Titanyl phthalocyanine-1,2-butanediol adduct compound | Y-type titanyl phthalocyanine | 80/20 | 40/60 | II-1 |
| Comparative Example 4 | Titanyl phthalocyanine-2,3-butanediol adduct compound | Y-type titanyl phthalocyanine | 80/20 | 40/60 | II-1 |
| Comparative Example 5 | Titanyl phthalocyanine-1,2-butanediol adduct compound | — | 100/0 | 40/60 | II-1 |
| Comparative Example 6 | Titanyl phthalocyanine-1,2-butanediol adduct compound | Y-type titanyl phthalocyanine | 80/20 | 40/60 | II-1 |
| Comparative Example 7 | Titanyl phthalocyanine-1,2-butanediol adduct compound | α-type titanyl phthalocyanine | 80/20 | 40/60 | II-1 |
| Comparative Example 8 | Titanyl phthalocyanine-2,3-butanediol adduct compound | α-type titanyl phthalocyanine | 80/20 | 40/60 | II-1 |
| Comparative Example 9 | — | Y-type titanyl phthalocyanine | 0/100 | 40/60 | II-1 |
| Comparative Example 10 | — | Y-type titanyl phthalocyanine | 0/100 | 40/60 | II-1 |
| Comparative Example 11 | — | Y-type titanyl phthalocyanine | 0/100 | 40/60 | II-1 |
| Comparative Example 12 | — | Y-type titanyl phthalocyanine | 0/100 | 40/60 | II-1 |

TABLE 7-continued

| | Composition of charge generation layer (CGL) | | | | Charge transport layer (CTL) |
|---|---|---|---|---|---|
| | CGM1 | CGM2 | CGM1/CGM2 | CGM/resin | CTM |
| Comparative Example 13 | — | Y-type titanyl phthalocyanine | 0/100 | 40/60 | II-1 |

TABLE 8

| | Electric characteristics before and after printing duration | | Potential characteristics in environmental variation Potential stabilities at | Transfer performance | |
|---|---|---|---|---|---|
| | Amount of reduction in retention rate ΔVk5 | Amount of increase in residual potential ΔVL | high temperature and high humidity and at low temperature and low humidity | Difference ΔV0 in charge potential by presence of transfer voltage | Transfer ghost |
| Example 1 | ○ | ○ | ○ | 5 | • |
| Example 2 | ○ | ○ | ○ | 6 | • |
| Example 3 | ○ | ○ | ○ | 11 | ○ |
| Example 4 | ○ | ○ | ○ | 6 | • |
| Example 5 | ○ | ○ | ○ | 7 | • |
| Example 6 | ○ | ○ | ○ | 13 | ○ |
| Example 7 | ○ | ○ | ○ | 7 | • |
| Example 8 | ○ | ○ | ○ | 12 | ○ |
| Example 9 | ○ | ○ | ○ | 5 | • |
| Example 10 | ○ | ○ | ○ | 12 | ○ |
| Example 11 | • | ○ | ○ | 14 | ○ |
| Example 12 | • | ○ | ○ | 13 | ○ |
| Example 13 | • | ○ | ○ | 11 | ○ |
| Example 14 | • | ○ | ○ | 15 | ○ |
| Example 15 | • | ○ | ○ | 13 | ○ |
| Example 16 | • | ○ | ○ | 12 | ○ |
| Example 17 | ○ | ○ | ○ | 16 | ○ |
| Example 18 | • | ○ | ○ | 12 | ○ |
| Example 19 | ○ | ○ | ○ | 14 | ○ |
| Example 20 | ○ | ○ | ○ | 17 | ○ |
| Example 21 | • | ○ | ○ | 11 | ○ |
| Example 22 | ○ | ○ | ○ | 13 | ○ |
| Example 23 | • | ○ | ○ | 18 | ○ |
| Example 24 | • | ○ | ○ | 12 | ○ |

TABLE 9

| | Electric characteristics before and after printing duration | | Potential characteristics in environmental variation Potential stabilities at | Transfer performance | |
|---|---|---|---|---|---|
| | Amount of reduction in retention rate ΔVk5 | Amount of increase in residual potential ΔVL | high temperature and high humidity and at low temperature and low humidity | Difference ΔV0 in charge potential by presence of transfer voltage | Transfer ghost |
| Example 25 | • | ○ | ○ | 14 | ○ |
| Example 26 | • | ○ | ○ | 16 | ○ |
| Example 27 | • | ○ | ○ | 15 | ○ |
| Example 28 | • | ○ | ○ | 17 | ○ |
| Example 29 | ○ | ○ | ○ | 10 | ○ |
| Example 30 | ○ | ○ | ○ | 15 | ○ |
| Example 31 | • | ○ | ○ | 10 | ○ |
| Example 32 | • | ○ | ○ | 13 | ○ |
| Example 33 | ○ | ○ | ○ | 18 | ○ |
| Example 34 | ○ | ○ | ○ | 12 | ○ |
| Example 35 | • | ○ | ○ | 16 | ○ |

TABLE 9-continued

| | Electric characteristics before and after printing duration | | Potential characteristics in environmental variation | Transfer performance | |
|---|---|---|---|---|---|
| | Amount of reduction in retention rate ΔVk5 | Amount of increase in residual potential ΔVL | Potential stabilities at high temperature and high humidity and at low temperature and low humidity | Difference ΔV0 in charge potential by presence of transfer voltage | Transfer ghost |
| Example 36 | • | ○ | ○ | 10 | ○ |
| Example 37 | ○ | ○ | ○ | 13 | ○ |
| Example 38 | • | ○ | ○ | 12 | ○ |
| Example 39 | • | ○ | ○ | 14 | ○ |
| Example 40 | • | ○ | ○ | 16 | ○ |
| Example 41 | • | ○ | ○ | 15 | ○ |
| Example 42 | ○ | ○ | ○ | 19 | ○ |
| Example 43 | • | ○ | ○ | 13 | ○ |
| Example 44 | • | ○ | ○ | 15 | ○ |
| Example 45 | • | ○ | ○ | 18 | ○ |
| Example 46 | • | ○ | ○ | 16 | ○ |
| Example 47 | ○ | ○ | ○ | 13 | ○ |
| Example 48 | • | ○ | ○ | 12 | ○ |

TABLE 10

| | Electric characteristics before and after printing duration | | Potential characteristics in environmental variation | Transfer performance | |
|---|---|---|---|---|---|
| | Amount of reduction in retention rate ΔVk5 | Amount of increase in residual potential ΔVL | Potential stabilities at high temperature and high humidity and at low temperature and low humidity | Difference ΔV0 in charge potential by presence of transfer voltage | Transfer ghost |
| Example 49 | • | ○ | ○ | 17 | ○ |
| Example 50 | • | ○ | ○ | 14 | ○ |
| Example 51 | • | ○ | ○ | 16 | ○ |
| Example 52 | ○ | ○ | ○ | 13 | ○ |
| Example 53 | • | ○ | ○ | 12 | ○ |
| Comparative Example 1 | Δ | Δ | ○ | 45 | x |
| Comparative Example 2 | Δ | Δ | ○ | 39 | Δ |
| Comparative Example 3 | x | x | ○ | 48 | x |
| Comparative Example 4 | x | Δ | ○ | 42 | x |
| Comparative Example 5 | Δ | Δ | ○ | 37 | Δ |
| Comparative Example 6 | x | x | ○ | 39 | Δ |
| Comparative Example 7 | Δ | Δ | ○ | 51 | x |
| Comparative Example 8 | x | Δ | ○ | 38 | Δ |
| Comparative Example 9 | Δ | x | x | 55 | x |
| Comparative Example 10 | Δ | Δ | Δ | 23 | Δ |
| Comparative Example 11 | x | Δ | x | 25 | Δ |
| Comparative Example 12 | Δ | x | Δ | 26 | Δ |
| Comparative Example 13 | x | Δ | x | 22 | Δ |

It could be confirmed from the results shown in Tables above that each of Examples 1 to 53, where the zinc oxide particle surface-treated with the N-acylated amino acid or its salt was at least used as the filler in the undercoat layer in the photoconductor and furthermore the adduct compound of titanyl phthalocyanine and butanediol was included as the charge generation material in the charge generation layer, provided the photoconductor where not only the stability of the potential retention rate of a photoconductor surface before and after repeated printing duration was maintained, but also an increase in surface residual potential was sufficiently suppressed and also the respective variations in charge potentials at a low temperature and a low humidity and at a high temperature and a high humidity were kept small, and the occurrence of transfer ghost was suppressed and furthermore the image quality was stabilized. It can be seen that the second filler is contained to result in an improvement in amount of reduction in retention rate, and in particular, titanium oxide treated with a silane coupling agent is added to result in an enhancement in amount of reduction in retention rate (ΔVk5), less than 1.0, as compared with Examples 1 to 10 and Examples 11 to 53. The reason for this is presumed because the amount of reduction in surface charge potential is decreased.

On the other hand, in each of Comparative Examples 1 to 8, in a case where the charge generation layer included the adduct compound of titanyl phthalocyanine and butanediol and the undercoat layer did not include any zinc oxide particle surface-treated with an N-acylated amino acid or its salt, it was confirmed that, while the respective variations in charge potentials at a low temperature and a low humidity and at a high temperature and a high humidity were kept low and electric characteristics in environmental variation were favorable, the potential retention rate of a photoconductor surface before and after repeated printing duration was reduced and an increase in surface residual potential (deterioration in electric characteristics before and after printing duration) and deterioration in transfer performance were observed.

In addition, in Comparative Example 9, in a case where the undercoat layer did not include any zinc oxide particle surface-treated with an N-acylated amino acid or its salt and the charge generation layer did not include any adduct compound of titanyl phthalocyanine and butanediol, not only a reduction in potential retention rate of a photoconductor surface before and after repeated printing duration and an increase in surface residual potential (deterioration in electric characteristics before and after printing duration) were confirmed, but also the respective variations in charge potentials at a low temperature and a low humidity and at a high temperature and a high humidity (potential characteristics in environmental variation) were increased and furthermore, if the transfer voltage was set high, the occurrence of distinct transfer ghost was also confirmed.

Furthermore, in each of Comparative Examples 10 to 13, in a case where the undercoat layer contained the zinc oxide particle surface-treated with the N-acylated amino acid or its salt and the charge generation layer did not include any adduct compound of titanyl phthalocyanine and butanediol, not only a reduction in potential retention rate of a photoconductor surface before and after repeated printing duration and an increase in surface residual potential (decrease in electric characteristics before and after printing duration) were confirmed, but also the respective variations in charge potentials (potential characteristics in environmental variation) at a low temperature and a low humidity and at a high temperature and a high humidity were increased and furthermore, if the transfer voltage was set high, the occurrence of distinct transfer ghost was also confirmed.

It could be confirmed that the above combination of the undercoat layer and the charge generation layer allowed a photoconductor to be obtained, in which not only the stability of the potential retention rate of a photoconductor surface before and after repeated printing duration was maintained, but also an increase in surface residual potential was sufficiently suppressed (enhancements in electric characteristics before and after printing duration) and the respective variations in charge potentials at a low temperature and a low humidity and at a high temperature and a high humidity were kept low, and the occurrence of transfer ghost was suppressed and furthermore the image quality was stabilized.

It has been confirmed from the foregoing that, according to the present invention, even in the case of mounting on an electrophotographic apparatus where the transfer voltage is set high for a high-speed process or a cleaner-less process, not only the stability of the potential retention rate of a photoconductor surface before and after repeated printing duration is maintained, but also an increase in surface residual potential is sufficiently suppressed and the respective variations in charge potentials at a low temperature and a low humidity and at a high temperature and a high humidity are kept small, and furthermore a stable image hardly causing transfer ghost is obtained.

DESCRIPTION OF SYMBOLS

1 conductive substrate
2 undercoat layer
3 photosensitive layer
4 charge generation layer
5 charge transport layer
6, 7 photoconductor
8 charging roller
9 electrometer
10 transfer roller
21 charging member
22 high-voltage power supply
23 image exposure member
24 developer
241 development roller
25 sheet-feeding member
251 sheet-feeding roller
252 sheet-feeding guide
26 transfer charger (direct charging type)
27 cleaning apparatus
271 cleaning blade
28 discharging member
29 sheet (printing on first sheet)
30 sheet (printing on second sheet)
60 electrophotographic apparatus

What is claimed is:

1. An electrophotographic photoconductor comprising:
a conductive substrate; and
an undercoat layer and a photosensitive layer sequentially provided on the conductive substrate, wherein
the photosensitive layer is a negatively-charged stacked type having a charge generation layer and a charge transport layer, the charge generation layer containing an adduct compound of titanyl phthalocyanine and butanediol;
the undercoat layer contains a resin binder and a first filler, the first filler containing a zinc oxide particle surface-treated with an N-acylated amino acid or an N-acylated amino acid salt;
the undercoat layer further contains a second filler, the second filler containing a titanium oxide particle surface-treated with an aminosilane compound; and
an amount of the zinc oxide particle surface-treated with the N-acylated amino acid or the N-acylated amino acid salt thereof, with respect to a total amount of fillers including the first filler and the second filler is 20% by mass or more and 80% by mass or less.

2. The electrophotographic photoconductor according to claim 1, wherein the adduct compound of titanyl phthalocyanine and butanediol contains one or more compound selected from the group consisting of an adduct compound of titanyl phthalocyanine and 1,2-butanediol, an adduct compound of titanyl phthalocyanine and 2,3-butanediol, and their optical isomers.

3. The electrophotographic photoconductor according to claim 1, wherein an average primary particle size of the zinc oxide particle is 1 nm to 350 nm.

4. The electrophotographic photoconductor according to claim 1, wherein the resin binder contains two or more resins selected from the group consisting of an acrylic resin, a melamine resin, and a polyvinyl phenol resin.

5. The electrophotographic photoconductor according to claim 1, wherein a mass ratio between the first filler and the resin binder in the undercoat layer is 50/50 to 90/10.

6. A method of manufacturing the electrophotographic photoconductor according to claim 1, comprising the steps of:

preparing an undercoat layer coating liquid containing the zinc oxide particle surface-treated with an N-acylated amino acid or its salt;

coating a surface of the conductive substrate with the undercoat layer coating liquid to thereby form the undercoat layer on the conductive substrate;

preparing a charge generation layer coating liquid containing the adduct compound of titanyl phthalocyanine and butanediol; and coating a surface of the undercoat layer with the charge generation layer coating liquid to thereby form the charge generation layer on the undercoat layer.

7. An electrophotographic apparatus comprising the electrophotographic photoconductor according to claim 1.

* * * * *